United States Patent [19]
Akiyama et al.

[11] Patent Number: 5,539,825
[45] Date of Patent: Jul. 23, 1996

[54] ELECTRONIC CASHLESS TRANSACTION SYSTEM

[75] Inventors: Ryota Akiyama; Takayuki Hasebe, both of Kawasaki, Japan

[73] Assignee: Fujitsu Limited, Kawasaki, Japan

[21] Appl. No.: 345,416

[22] Filed: Nov. 21, 1994

Related U.S. Application Data

[62] Division of Ser. No. 953,375, Sep. 30, 1992, Pat. No. 5,428,684.

[30] Foreign Application Priority Data

Sep. 30, 1991 [JP] Japan ..................................... 3-278831

[51] Int. Cl.$^6$ ..................................................... H01K 1/00
[52] U.S. Cl. ................................ 380/24; 380/23; 379/91; 235/379
[58] Field of Search ............................. 379/91; 235/379, 235/380; 380/23, 24, 25

[56] References Cited

U.S. PATENT DOCUMENTS

| | | | |
|---|---|---|---|
| 4,799,061 | 1/1989 | Abraham et al. | 380/23 X |
| 5,012,076 | 4/1991 | Yoshida | 235/379 |
| 5,120,939 | 6/1992 | Claus et al. | 235/382 |
| 5,175,416 | 12/1992 | Mansvelt et al. | 235/379 |
| 5,224,162 | 6/1993 | Okamoto et al. | 380/24 |
| 5,379,344 | 1/1995 | Larsson | 380/23 |

OTHER PUBLICATIONS

Wwinstein, Stephen; IEEE Spectrum; "Smart credit cards: the answer to cashless shopping"; Feb. 1984; pp. 43–49;379/91.

*Primary Examiner*—David C. Cain
*Attorney, Agent, or Firm*—Nikaido, Marmelstein, Murray & Oram

[57] ABSTRACT

A key control method is for use in an electronic cashless transaction system including at least a bank center, a store transaction terminal and an IC card being used as an electronic cashless transaction medium. The key control method comprises a step of having the bank center generate and code a first parameter for a transmission to the IC card; a step of having the IC card receive and decode the coded first parameter by using the first key, thereby reconstructing the first parameter issued by the bank center, perform a first operation on the first parameter and a password of a holder of the IC card, and store in a first register; a step of having the store transaction terminal send to the IC card a second parameter coded by a second key, when the holder inserts the IC card 11 into the store transaction terminal; a step of having the IC card decode the coded second parameter by using the second key, thereby reconstructing the second parameter received from the store transaction terminal, perform a second operation on the second parameter and the value stored in the first register, store a result of the second operation in the second register; and a step of decoding a value stored in the second register by using a coding session key stored in a memory of the IC card, thereby obtaining a key for an intended authentication.

6 Claims, 21 Drawing Sheets

5,539,825

ELECTRONIC CASHLESS TRANSACTION SYSTEM

This is a division, of application Ser. No. 07/953,375 filed Sep. 30, 1992 now U.S. Pat. No. 5,428,684.

BACKGROUND OF THE INVENTION

1. Field of the Invention

This invention pertains to a security enhancement for an electronic cashless transaction system comprising elements such as a bank center, a bank ATM (automatic teller machine) [e.g. a modified CD (cash dispenser)], an IC (Integrated Circuit) card [e.g. an IC smart card or an IC memory card] and a store transaction terminal [e.g. a modified POS (point of sales) terminal]. [A store is defined as a retailer, a wholesaler, a shop storage area or the like.] More specifically, it relates first to a system for controlling a key necessary for authenticating elements in proper operations of the electronic cashless transaction system and second to a money transfer system for enhancing the security of transferring money stored in the IC card.

2. Description of the Related Arts Recently, a variety of debit cards have been offered for sales, which shed or reduce the necessity for carrying or using changes, and improve cash flows of the issuers. In Japan, those cards are used for paying a telephone charge for a call from a public phone booth, a transportation fare at a train station or even aboard a bus, and a food voucher at a restaurant.

However, most debit cards are currently good only for specific goods or services offered by the issuers, they are not valid for merchandise transactions in general. Besides, most debit cards offered for sales in Japan are of a disposable type, i.e. good only for the use of their stated values, unlike fare cards offered for sales e.g. by the BART in San Francisco, which allow additional fares to be supplemented for storage.

Therefore, an all-in-one card is awaited as an powerful electronic cashless transaction medium, whereby a financial institution, e.g. a bank, issues an IC card to its customer such that he asks his bank to credit a desired amount to his IC card, e.g. by transferring from his other accounts, and a participating store to debit a purchase amount to the card and credits the same to the store's account, thereby consummating a transaction without an actual exchange of cash. In the following description, debits and credits are defined as being from the ledger entries of the issuers of the all-in-one cards, and are exactly the opposite for the holders of such cards.

Such an all-in-one card system has an advantage in safety and efficiency in that the customers need not carry cash and stores and banks need not physically transport printed bills and coins accumulated as sales proceeds.

However, such an advantage is premised on an wholeness of an ATM, an IC card, and a store's POS system.

FIG. 1 is a block diagram of a conventional electronic cashless transaction system using an all-in-one card, based on an IC card 11.

The conventional cashless system comprises an IC card 11, a store transaction terminal (POS terminal) 12 provided at a participating store allowing a holder of the IC card 11 to make a purchase, and a bank center 13.

The bank center 13 has a customer account 14 of the holder of the IC card 11, a customer card balance log file 15 for storing data on an amount a holder transfers to his card, an unsettled funds file 16 for storing the sum total of amounts a user transfers to a plurality of cards, a store account 17 of a participating store into which the sales proceeds are transferred from the unsettled funds file 16. A bank center 13 has at least one [1] unsettled funds file 16. A customer account 14 and a customer card balance file 15 exist for each holder of the IC card 11. A store account 17 exists for each participating store.

The IC card 11 has a balance storage register 18 for registering the amount expendable with the IC card 11. Also, the store transaction terminal 12 has a sales data file 19 for storing the total amount of the sales and the total amount of the sales returns and allowances.

A holder of the IC card 11 transfers money to his card before using it. He enters his PW (password) from a keypad on the IC card 11. After activating the IC card 11, he accesses the bank center 13 via a finance terminal or a money transfer terminal such as an ATM 20. On determining that the amount the holder wishes to transfer to the IC card 11 of his own is within the funds balance or a predetermined revolving limit of the customer account 14, the bank center 13 instructs the ATM 20 to credit the transferred amount (a card transfer amount 21) to the balance storage register 18 in the IC card 11 and to debit the same to the customer account 14 of his own. That is, at the same time, the bank center 13 stores the card balance in the customer card balance log file 15.

The customer card balance log file 15 operates as a first check in preventing a fraud using the IC card 11. This is because, since the amount stored in the balance storage register 18 of the IC card 11 cannot be more than the amount stored in the customer card balance log file 15, an amount stored in the balance storage register 18 of the IC card 11 which is more than the amount stored in the customer card balance log file 15 can be construed as a possible falsification of the IC card 11.

Also, the amount stored in the customer card balance log file 15 can be used as a basis for calculating an insured value for the holder of the IC card 11 for compensating a damage to or a loss of the IC card 11.

When a store has the store transaction terminal 12 credit to the IC card 11 an amount of a sales return and allowance, the bank center 13 has the customer card balance log file 15 control an amount credited by a store due to a sales return and allowance separately from an amount credited by a holder of the IC card 11 due to a transfer-in from his other account, thereby limiting the amount a store can credit a customer on the IC card 11 as a sales return and allowance, e.g. to the credit balance posted in the unsettled funds file 16.

The holder of the IC card 11 wishing to make a purchase at a participating store inserts the IC card 11 into the store transaction terminal 12 indicating a sales amount or an amount of sales returns and allowances, and enters his PW on the keypad of the IC card 11, thereby performing a purchase activation 22 of the IC card 11. The store transaction terminal 12 updates the fund balance stored in the balance storage register 18 of the IC card 11 by debiting the sales amount or crediting the amount of sales returns and allowances, thereby performing a balance adjustment 23, and credits the sales amount or debits the amount of sales returns and allowances to the sales data file 19. More specifically, when the holder of the IC card 11 has an account in a bank A, the store transaction terminal 12 updates amounts a related to accounts for bank A in the sales data file 19.

The store transaction terminal 12 thus credits the total amount of sales or debits the total amount of the sales returns and allowances to the sales data file 19, then sends their sum totals to the bank center 13 by coding these amounts in the sales data file 19 after a lapse of a predetermined period. That is, the store transaction terminal 12 sends to the bank center 13 of bank A sales (billing) data 24 by coding the amounts a, comprising the amount of sales and the amount of sales returns and allowances. The bank center 13 decodes the sales (billing) data 24 and transfers the amounts from the unsettled funds file 16 to the store account 17.

FIG. 2 is a block diagram for explaining conventional updations of sales tallying data and a fund balance stored in the IC card 11 by the store transaction terminal 12.

As explained in the description of FIG. 1, a holder wishing to make a purchase inserts the IC card 11 into the store transaction terminal 12 after activating it by entering his PW, and allows the store transaction terminal 12 to debit a purchase amount 25. The purchase amount 25 is an input to an adder 26 of the store transaction terminal 12 and a subtracter 27 of the IC card 11, which is outputted to an amount display 28 of the IC card 11. This allows the holder of the IC card 11 to judge whether or not the purchase amount 25 is appropriate.

The other input to the adder 26 of the store transaction terminal 12 is sales tallying data 29. On receiving an input of the purchase amount 25, the adder 26 adds to the sales tallying data 29 data on the purchase amount 25, thereby updating the sales tallying data 29. Meanwhile, the other input to the subtracter 27 of the IC card 11 is the value of the balance storage register 18. On receiving an input of the purchase amount 25, the subtracter 27 subtracts the purchase amount 25 from the value of the balance storage register 18, and re-stores the difference in the balance storage register 18, thereby updating the balance.

As described above, a conventional all-in-one card system takes security measures, e.g. an access control for disabling the abuse by an inappropriate holder and a coding to prevent eavesdropping of line between a store and the bank center 13.

However, the conventional system such as described above has a security problem in that it has no defense against a fraud via the store transaction terminal 12.

FIG. 3 is a block diagram of a conventional process for transferring a replenishing amount to an all-in-one card, such as the IC card 11.

The system shown in FIG. 3 comprises the IC card 11, the ATM 20 for handling a money transfer from or to another account, and the bank center 13 of the issuer of the IC card 11.

The holder of the IC card 11 wishing to transfer money to or from the IC card 11 inserts the IC card 11 into the ATM 20 after activating the IC card 11 by entering his PW for the IC card 11 e.g. from the keypad of the IC card 11. Alternatively, the holder may activate the IC card 11 by entering his PW from the touch sensor panel of the ATM 20 after inserting the IC card 11 into the ATM 20. This allows a communications link to be established between the IC card 11 and the bank center 13 via the ATM 20.

Then, the holder of the IC card 11 inputs a transfer amount 34 (which is defined as being positive for a transfer-in to the IC card 11 and being negative for a transfer-out from the IC card 11) e.g. from the keyboard of the ATM 20. Alternatively, the holder of the IC card 11 can input the transfer amount 34 from the keypad of the IC card 11 before he inserts his card to the ATM 20.

Thereafter, the ATM 20 reads the balance stored in the IC card 11 (from the balance storage register 18) and sends to the bank center 13 data on the stored balance and on the transfer amount 34, asking for an authorization to credit or debit the transfer amount 34 to the IC card 11 and to debit or credit to the customer account 14.

The bank center 13 determines whether it can authorize the transfer-in to or transfer-out from the IC card 11, calculates a new balance by adding the transfer amount 34 to the hitherto stored balance, and sends the new balance to the ATM 20. The ATM 20 in turn stores the new balance to the IC card 11.

The above processes allow the IC card 11 to have a new balance, thereby completing a transfer-in or transfer-out.

Conventionally, the IC card 11 and the ATM 20 share a key-A 35 for coding communications between the IC card 11 and the ATM 20, thereby masking a protocol for a money transfer. However, in most cases, the communications between the ATM 20 and the bank center 13 are not coded. When they are in fact coded, the bank center 13 and the ATM 20 share a same key for coding and decoding the communications between them.

However, a conventional system such as this has a security problem with respect to an unauthorized money transfer due to its openness to eavesdropping. That is, the communications between the ATM 20 and the bank center 13, unless coded, are vulnerable to unwanted interceptions, which may allow one of skill to detect and analyze the data flow between the ATM 20 and the bank center 13 and transmit phony data that enable money to be transferred without a proper approval, or even bogus account data to be created.

Besides, even when the communications between the bank center 13 and the ATM 20 are coded, the key needs to be changed every time, for a defense against the possibility that a hacker can somehow log on to the ATM 20 and interpret the communications between the bank center 13 and the ATM 20 for the purpose of interfering with the system e.g. by destroying data.

SUMMARY OF THE INVENTION

This invention is conceived based on the above background. It aims at enhancing the security of an electronic cashless transaction system, thereby allowing versatile uses of an IC card as an almighty medium for commercial transactions in general.

A feature of this invention resides in a key control method for use in an electronic cashless transaction system including at least a bank center, a store transaction terminal and an IC card being used as an electronic cashless transaction medium. The key control method comprises a step of having the bank center generate and code a first parameter for a transmission to the IC card; a step of having the IC card receive and decode the coded first parameter by using the first key, thereby reconstructing the first parameter issued by the bank center, perform a first operation on the first parameter and a password of a holder of the IC card, and store in a first register; a step of having the store transaction terminal send to the IC card a second parameter coded by a second key, when the holder inserts the IC card 11 into the store transaction terminal; a step of having the IC card decode the coded second parameter by using the second key, thereby reconstructing the second parameter received from the store transaction terminal, perform a second operation on the second parameter and the value stored in the first register, store a result of the second operation in the second register; and a step of decoding a value stored in the second register by using a coding session key stored in a memory of the IC card, thereby obtaining a key for an intended authentication.

BRIEF DESCRIPTION OF THE DRAWINGS

One of skill in the art can easily understand additional features and objects of this invention from the description of the preferred embodiments and some of the attached drawings. In the drawings.

DESCRIPTION OF THE PREFERRED EMBODIMENTS

Figure 4:
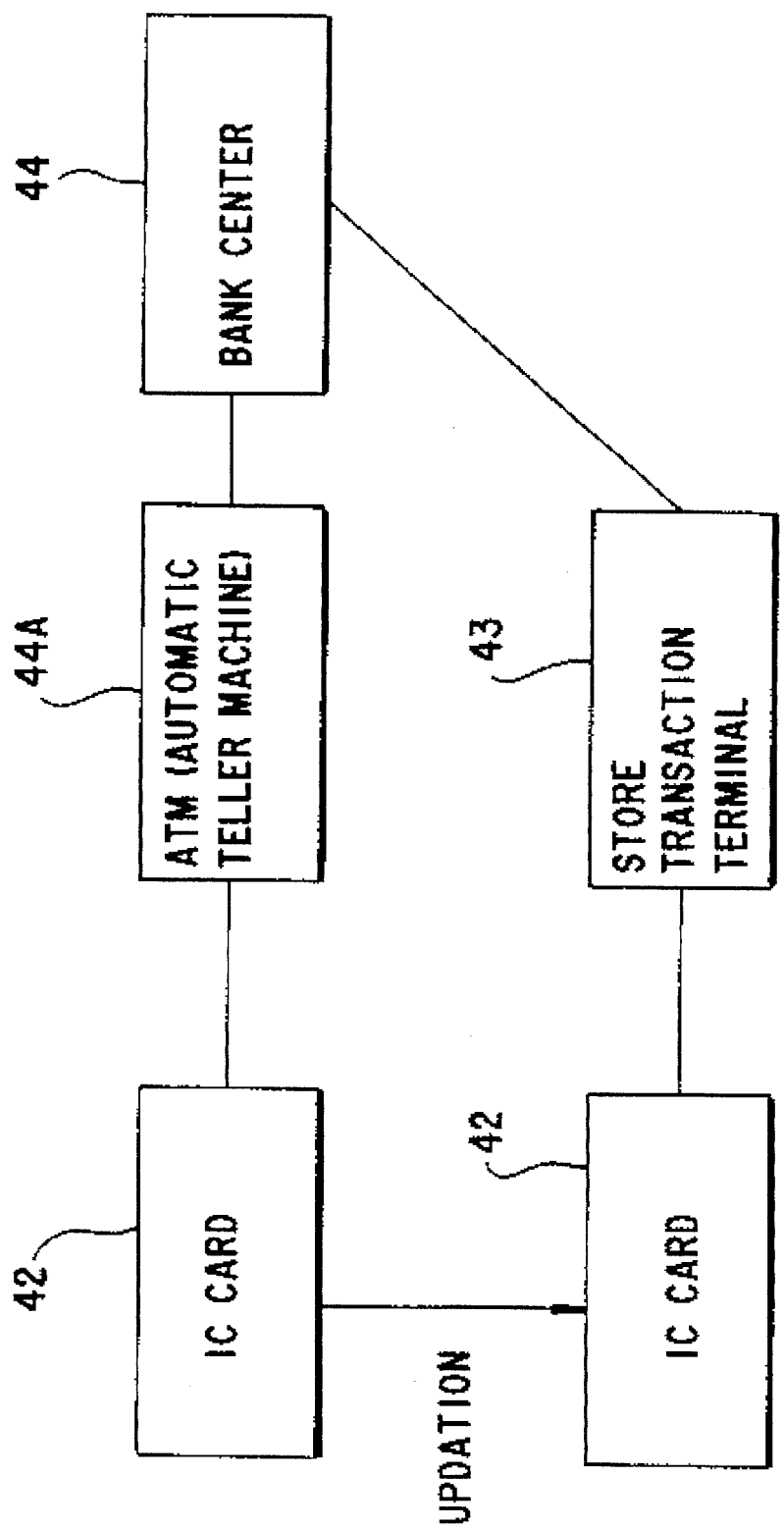
FIG. 4 is a block diagram of a first embodiment of an electronic cashless transaction system.

FIG. 4 is a block diagram of a first embodiment of an electronic cashless transaction system.

The transaction system using an electronic cashless medium of the first embodiment comprises a bank center 44, an ATM 44A, an IC card 42 and a store transaction terminal 43. The ATM 44A can be a CD (cash dispenser), with necessary functions, e.g. a data exchange function, attached. The store transaction terminal can be a POS terminal with necessary functions, e.g. a card reading function, attached. As described before, the IC card can be an IC smart card or IC memory card. The IC smart card comprises a CPO and a memory, and can be an IC memory card with necessary function, e.g. an access control function attached. Although the transaction system of the first embodiment of this invention basically operates in a manner similar to the conventional transaction system, it has differences in (1) a key control, including a control of a bank key, (2) an amount replenishment to the IC card 11, (3) an updation of sales data and (4) a sales billing. Described below are these principles.

Figure 5:
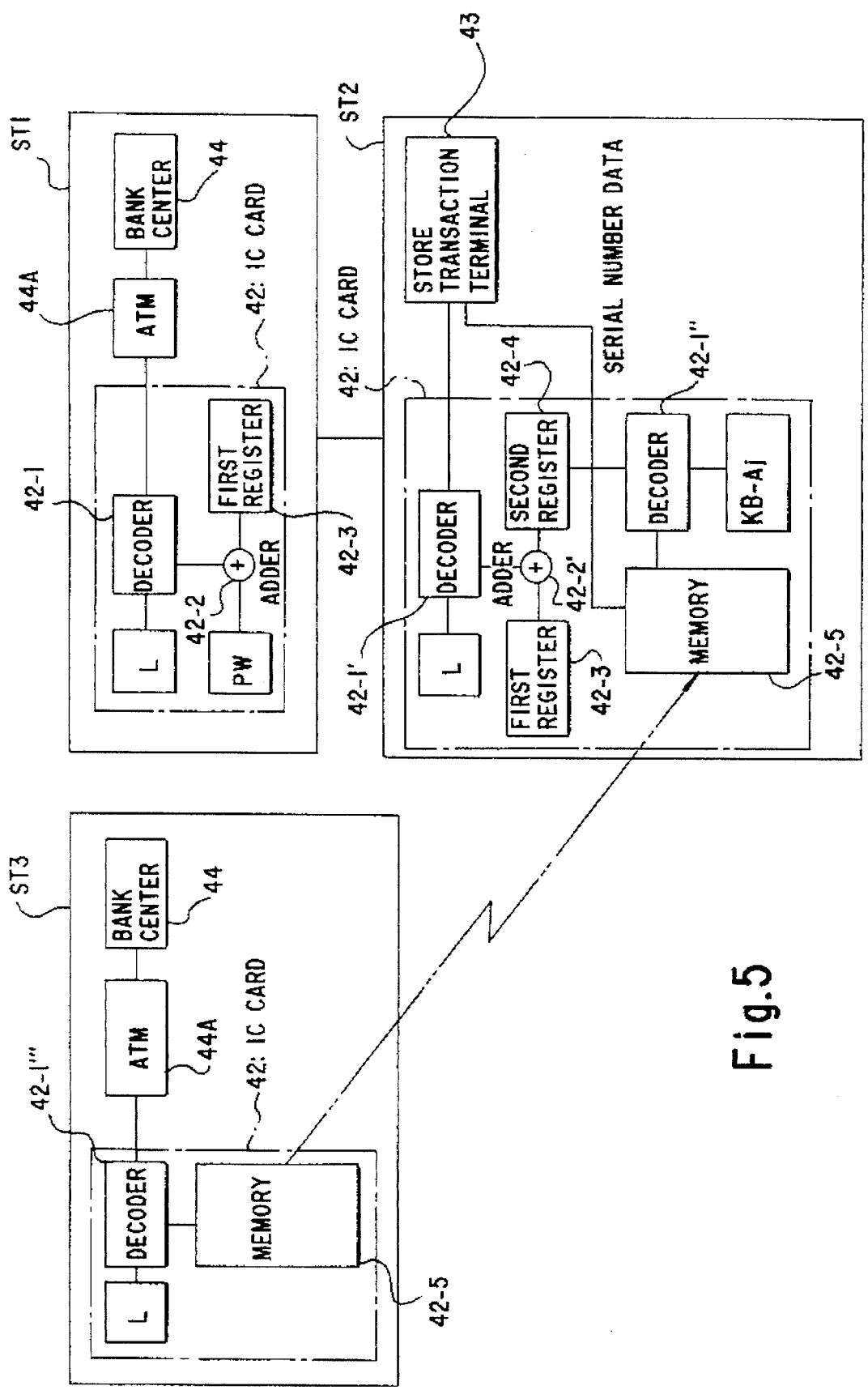
FIG. 5 is a block diagram outlining key control operations of this invention.

FIG. 5 is a block diagram outlining key control operations of this invention.

The first principle of this invention comprises a step (ST1) of procedures between the ATM 44A and the IC card 42, a step (ST2) of procedures between the IC card 42 and the store transaction terminal 43, and a step (ST3) of assigning a coding key to the IC card 42.

ST1

Step ST1 represents procedures between the IC card 42 and the bank center 44 via the ATM 44A. The bank center 44 randomly generates a first parameter, codes it by using a master key L, and supplies the coded first parameter to the IC card 42 via the ATM 44A.

After receiving the coded first parameter supplied via the ATM 44A, the IC card 42 has its decoder 42-1 decode the coded first parameter by using the master key L it shares with the bank center 44, thereby reconstructing the first parameter generated by the bank center 44. Then, the IC card 42 has its adder 42-2 add the first parameter thus decoded to a number converted from the PW entered by its holder, and has its first register 42-3 store the sum.

The IC card 42 may cause corresponding digits of the decoded first parameter and the number converted from the PW to undergo some other operations (e.g. a multiplication, a division, a subtraction, a disjunction, a conjunction, an exclusive disjunction or any combination thereof) instead of a simple addition by the adder 42-2, by incorporating a substitute operator. To summarize, the IC card 42 has the first register 42-3 store the result of operating a function whose variables comprise the decoded first parameter and the PW.

ST2

Step ST2 represents procedures between the IC card 42 and the store transaction terminal 43. The holder of the IC card 42 wishing to make a purchase at a participating store inserts the IC card 42 into a card reader of the store transaction terminal 43.

The store transaction terminal 43 sends to the IC card 42 a second parameter coded in advance by using the master key L of the bank center 44.

The IC card 42 has its decoder 42-1' decode the coded second parameter thus received by using the master key L it shares with the bank center 44, has its adder 42-2' add the second parameter thus decoded to the value the first register 42-3 stores in step ST1, and has a second register 42-4 store the sum.

As with the description of step ST1, the IC card 42 may cause corresponding digits of the decoded second parameter and the value stored in the first register 42-3 to undergo some other operations (e.g. a multiplication, a division, a subtraction, a disjunction, a conjunction, an exclusive disjunction or any combination thereof) instead of a simple addition by the adder 42-2', by incorporating a substitute operator. To summarize, the IC card 42 has the second register 42-4 store the result of operating a function whose variables comprise the decoded second parameter and the value stored in the first register 42-3.

Then, the IC card 42 has a decoder 42-1" decode the sum stored in the second register 42-4 by using a coding session key stored in its memory 42-5, thereby obtaining a key KB-Ai for an intended authentication.

To be more specific, the IC card 42 has its memory 42-5 store plural kinds of coding session keys, and receives serial number data comprising address data of the memory 42-5 on receiving the coded second parameter from the store transaction terminal 43, thereby accessing an address in the memory 42-5 corresponding to the serial number data leading to the output of a coding session key stored at the corresponding address. Then, the IC card 42 has the second register 42-4 decode the output by using the value of the second register 42-4, thereby obtaining key KB-Ai for an intended authentication.

ST3

Step ST3 represents procedures for issuing a series of coding session keys to the IC card 42 by the bank center 44.

Before the bank center 44 writes a series of coding session keys to the memory 42-5 in the IC card 42, the bank center 44 codes the series of coding session keys by using the master key L, and supplies the coded series of coding session keys to the IC card 42 via the ATM 44A. On receiving the coded series of coding session keys, the IC card 42 has its decoder 42-1''' decode the coded series of coding session keys and the memory 42-5 sequentially store the series of coding session keys thus decoded.

The bank center 44 may supply to the IC card 42 via the ATM 44A the series of session keys valid for a certain duration. Likewise, the bank center 44 may supply to the store transaction terminal 43 a plurality of coded second parameters, coded by the master key L of the bank center 44, valid for a certain duration.

To summarize the above, an electronic cashless transaction system shown in FIG. 5 controls keys, as follows:

The bank center 44 generates a first parameter, codes the first parameter, and supplies the coded first parameter to the IC card 42 via the ATM 44A. On receiving the coded first parameter supplied via the ATM 44A, the IC card 42 has its decoder 42-1 decode the coded first parameter by using its master key L it shares with the bank center 44, thereby reconstructing the first parameter issued by the bank center 44. Then, the IC card 42 has its adder 42-2 add the first parameter thus decoded to the PW controlled by the holder, and has its first register 42-3 store the sum. (Refer to step ST1.)

Then, the holder of the IC memory card 42 wishing to make a purchase at a participating store inserts the IC card 42 into a card reader of the store transaction terminal 43. The store transaction terminal 43 sends to the IC card 42 a second parameter coded in advance by the master key L of the bank center 44. On receiving a coded second parameter, the IC card 42 has its decoder 42-1' decode the coded second parameter by using its master key L it shares with the bank center 44, has its adder 42-2' add the second parameter thus decoded to the value stored in the first register 42-3, and has the second register 42-4 store the sum. Then, the IC card 42 has its decoder 42-1" decode the sum stored in the second register 42-4 by using one [1] of coding session keys stored in its memory 42-5, thereby obtaining key KB-Ai for an intended authentication. (Refer to step ST2.)

To be more specific, the IC card 42 has its memory 42-5 store a plurality of coding session keys, and receives serial number data including address data of the memory 42-5, on receiving the coded second parameter from the store transaction terminal 43, thereby accessing an address in the memory 42-5 specified by the address data of the serial number data, obtaining an output of a coding session key stored therein. Then, the IC card 42 has its decoder 42-1" decode the output by using the sum stored in the second register 42-4, thereby obtaining key KB-Ai for an intended authentication. (Refer to step ST2.)

When the bank center 44 has the ATM 44A write a series of coding session keys into the memory 42-5 of the IC card 42, the bank center 44 codes the series of coding session keys by using its master key L and supplies the coded series of coding session keys via the ATM 44A to the IC card 42. On receiving the coded series of coding session keys, the IC card 42 has its decoder 42-1''' decode the coded series of coding session keys by using its master key L it shares with the bank center 44, and has the memory 42-5 sequentially store the decoded series of coding session keys. (Refer to step ST3.)

When the bank center 44 issues a series of coding session keys, the bank center 44 may send a plurality of coding session keys corresponding to a predetermined duration to the IC card 42 via the ATM 44A. Also, when the bank center 44 issues coded second parameters to the store transaction terminal 43, the bank center 44 may send a plurality of data coded by the master key L.

The IC card 42 may substitute, instead of the adders 42-2 and 42-2' shown in FIG. 5, some other operators as devices for operating on the first and second parameters supplied by the bank center 44 via the ATM 44A. The bank center 44 and the IC card 42 share the master key L for coding and decoding data exchanged between them.

Figure 6:
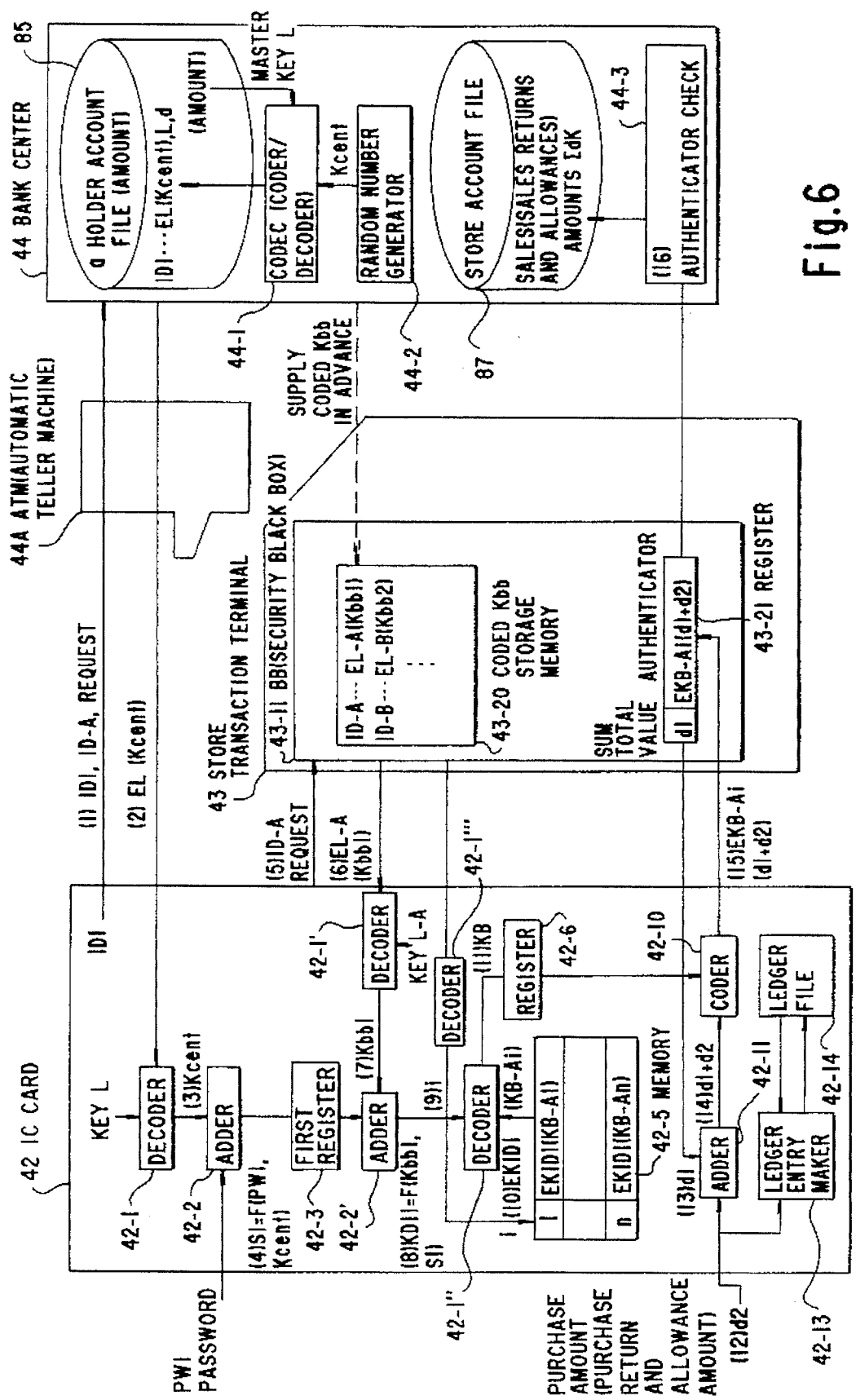
FIG. 6 shows in further detail the processes for controlling coding session keys.

FIG. 6 shows in further detail the processes for controlling coding session keys.

Figure 1:
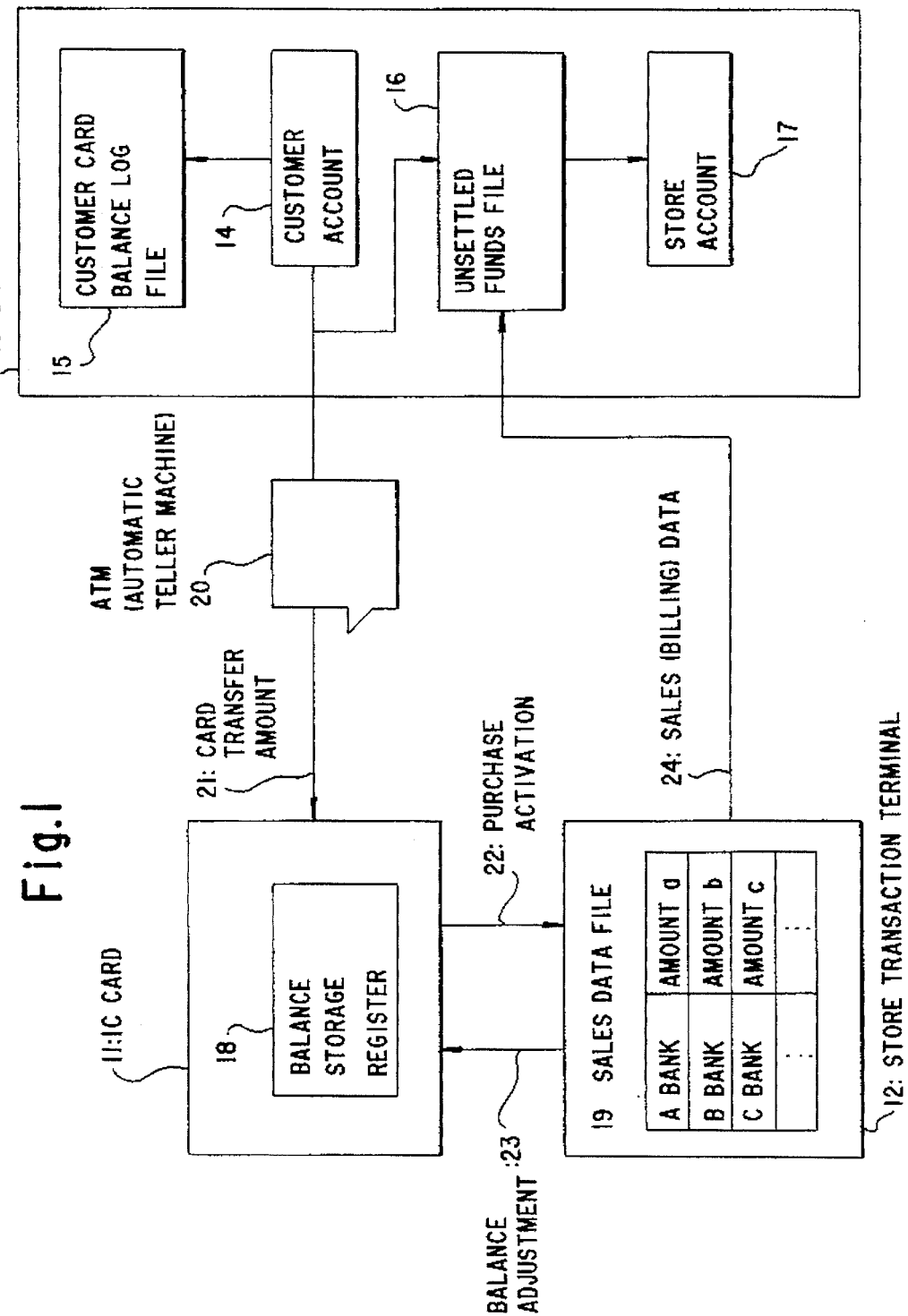
FIG. 1 is a block diagram of a conventional electronic cashless transaction system using an all-in-one card, based on an IC card.
Figure 2:
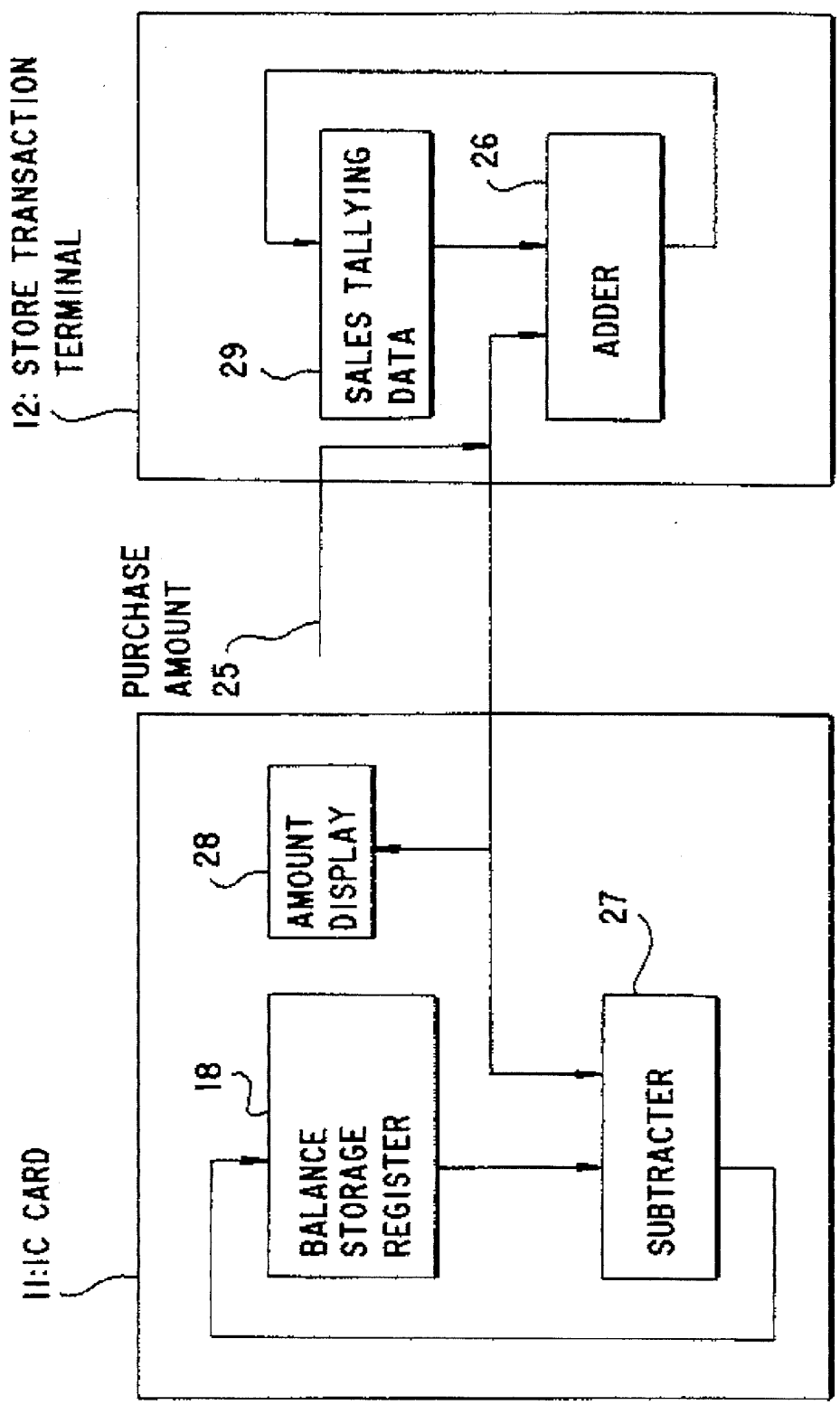
FIG. 2 is a block diagram for explaining conventional updations of sales tallying data and a fund balance stored in the IC card 11 by the store transaction terminal 12.
Figure 3:
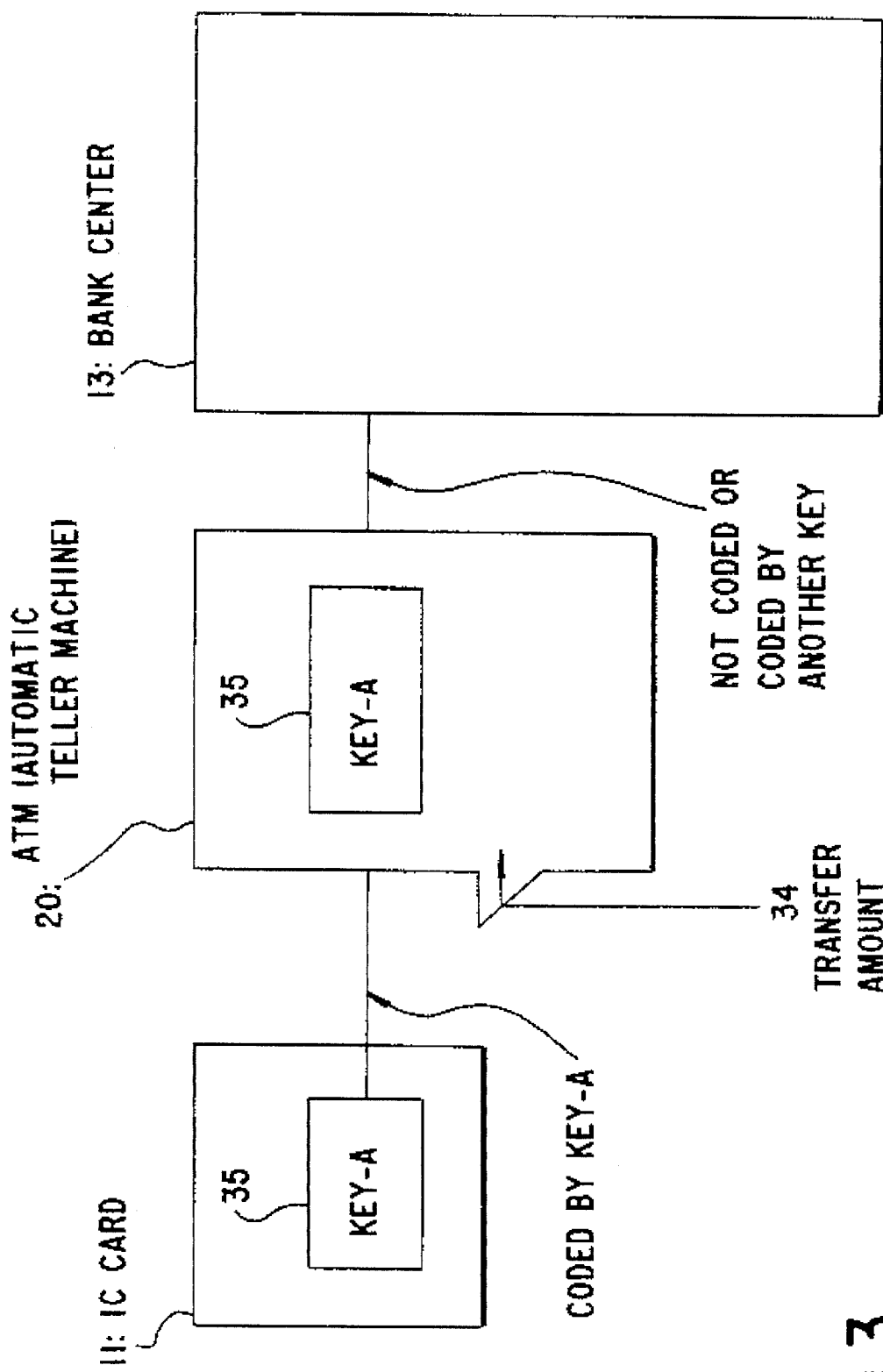
FIG. 3 is a block diagram of a conventional process for transferring a replenishing amount to an all-in-one card, such as the IC card 11.

The flow shown in FIG. 6 is similar to that shown in FIG. 3 except for the processes for controlling coding session keys.

When a holder of the IC card 42 uses his card initially or replenishes a depleted amount to his card, he must transfer-in an amount to the IC card 42 e.g. from his other account. Likewise, when a holder of the IC card 42 divests an excess amount from his card, he must transfer-out an amount from the IC card 42 e.g. to his other account.

The holder of the IC card 42 wishing to transfer money to or from the IC card 42 inserts the IC card 42 into the ATM 44A after activating the IC card 42 by entering his PW to the IC card 42 e.g. from the keypad of the IC card 42. Alternatively, the holder may activate the IC card 42 by entering his PW e.g. from the touch sensor panel of the ATM 44A after inserting the IC card 42 into the ATM 44A. This allows a communications link to be established between the IC card 42 and the bank center 44 via the ATM 44A, when the bank center 44 obtains a key of the IC card 42 based on the PW and the card identification number sent from the ATM 44A after the holder confirms that he has entered to the ATM 44A the correct PW of the IC card 42.

After the communications link is established, the bank center 44 activates a CODEC (coder/decoder) 44-1 and a random number generator 44-2. The random number generator 44-2 generates a random number (corresponding to the first parameter in the description of step ST1 shown in FIG. 5), which becomes a key for creating a session key. The CODEC 44-1 codes by the master key L the random number generated as the session key by the random number generator 44-2 and sends the coding session key to the IC card 42.

The IC card 42 has its decoder 42-1 decode the coding session key by its key L-A, provided in correspondence with bank A. A holder of the IC card 42 updates the balance by using the decoded session key.

Then, the holder of the IC card 42 inputs a transfer amount (which is defined as being positive for a transfer-in to the IC card 42 and being negative for a transfer-out from the IC card 42) e.g. from the keyboard of the ATM 44A. Alternatively, the holder of the IC card 42 can input the transfer amount from the keypad of the IC card 42 before he inserts his card to the ATM 44A.

Thereafter, the ATM 44A reads the balance stored in an IC card ledger file 54 (shown in FIG. 7) of the IC card 42 and sends to the bank center 44 data on the stored balance and on the transfer amount after coding the data on the stored balance by the decoded session key, asking for an authorization to credit (or debit) the transfer amount to the IC card 42 and to debit (or credit) to the customer account 14 for a transfer-in (or a transfer-out).

The bank center 44 has its CODEC 44-1 decode the coded data on the stored balance and on the transfer amount, determines whether it can authorize the transfer-in to or transfer-out from the IC card 42, calculates a new balance by adding the transfer amount to the hitherto stored balance, and sends to the IC card 42 via the ATM 44A the new balance coded by the session key. The IC card 42 in turn decodes the new balance by the session key and has the IC card ledger file 54 store the new balance.

To be more specific, before having its balance storage register store the new balance, the IC card 42 confirms the authenticity of a communicant by sending query data to the communicant. The communicant returns to the IC card 42 response data for proving its authenticity as the bank center 44. The IC card 42 examines the response data for an authentication of the bank center 44.

These communications between the IC card 42 and the bank center 44 are all coded and decoded by using the same session key as that for other communications between them, e.g. for exchanging data on the stored balance.

The IC card 42 updates its stored balance to the new balance only when it confirms the authenticity of the communicant through the above exchanges.

The above processes allow the IC card 42 to have a new balance, thereby completing a transfer-in or transfer-out.

In addition, the first embodiment of this invention features a key control including a periodic updation e.g. at each money transfer or every several days. These operations are described in further detail by the following procedures expressed as parenthesized numbers shown in FIG. 6.

Procedures (1) through (4) correspond to step ST1 shown in FIG. 5, which represents procedures between the IC card 42 and the bank center 44 via the ATM 44A.

(1) The IC card 42 sends to the bank center 44 via the ATM 44A its account identification number ID1 and its bank identification number ID-A.

(2) The bank center 44 has its holder account file 85 store a master key L corresponding to the account identification number ID1. The bank center 44A has its CODEC (coder/decoder) 44-1 code into a coded parameter EL(Kcent) a random number Kcent generated by the random number generator 44-2 by using the master key L, and supplies the coded parameter EL(Kcent) to the IC card 42.

(3) On receiving the coded parameter EL(Kcent) from the ATM 44A, the IC card 42 has its decoder 42-1 decode the coded parameter EL(Kcent) into Kcent by using the master key L it shares with the bank center 44. The IC card 42 exclusively uses Kcent as a first parameter for coding and decoding communications data exchanged between the bank center 44 and the IC card 42.

(4) On receiving Kcent from decoder 42-1, adder 42-2 adds password PW1 to Kcent, thereby obtaining a second parameter S1 for use in the IC card 42, and stores the sum in the first register 42-3. The IC card 42 may substitute adder 42-2 by some other operator operating on the same input variables, i.e. Kcent and PW1.

Procedures (5) through (15) correspond to step ST2 shown in FIG. 5, which represents procedures between the IC card 42 and the store transaction terminal 43.

(5) The holder of the IC card 42 wishing to make a purchase inserts his card into a card reader of the store transaction terminal 43. This insertion causes the bank identification number ID-A and a communications request to be transmitted to the store transaction terminal 43.

(6) On receiving the communications request from the IC card 42, the store transaction terminal 43 sends to the IC card 42 a coded Kbb, EL-A(Kbb1), corresponding to the bank identification number ID-A transmitted from a coded Kbb storage memory 43-20 in a security black box (BB) 43-11. More specifically, the bank center 44 has supplied to the store transaction terminal 43 EL-A(Kbb1) obtained in advance by coding Kbb1 by using key L-A. (7) On receiving the coded Kbb, EL-A(Kbb1), from the store transaction terminal 43, the IC card 42 has its decoder 42-1 decode the coded Kbb, EL-A(Kbb1), by using key L-A, thereby reconstructing Kbb1.

(8) On receiving from decoder 42-1' Kbb1 obtained by decoding EL-A(Kbb1), adder 42-2' adds Kbb1 to the second parameter S1, thereby obtaining a sum as KID1, and sends KID1 to decoder 42-1'. The IC card 42 may substitute adder 42-2' by some other operator operating on the same input variables, i.e. Kbb1 and S1.

(9) Meanwhile, the store transaction terminal 43 also outputs to the IC card 42 a serial number i at about the same time it outputs a coded Kbb, EL-A(Kbb1).

(10) On receiving serial number i from the store transaction terminal 43, the IC card 42 reads a coded bank key EKID1(KB-Ai) from an address corresponding to serial number i of the memory 42-5, and sends coded bank key EKID1(KB-Ai) to decoder 42-1'. Coded bank keys EKID1(KB-A1) through EKID1(KB-An) stored in first through n-th addresses of memory 42-5 are coded in advance by using key KID1.

(11) On receiving key KID1 and coded bank key EKID1(KB-Ai) respectively from adder 42-2' and the memory 42-5, decoder 42-1' decodes coded bank key EKID1(KB-Ai) into bank key KB-Ai by using key KID1 for its output to coder 42-10.

An insertion of the IC card 42 into the store transaction terminal 43 automatically executes procedures (5) through (11), thereby causing bank key KB-Ai to be obtained.

(12) Upon confirming a purchase amount (purchase return and allowance amount) d2 displayed on a monitor screen of the store transaction terminal 43, the holder of the IC card 42 inserts his card into the card reader of the store transaction terminal 43.

(13) The store transaction terminal 43 has the register 43-21 in the BB 43-11 store a sum total value d1 and an authenticator EKB-Ai(d1+d2). On acceptance of the IC card 42, the store transaction terminal 43 outputs the sum total value d1 (i.e. accumulated transaction data) corresponding to serial number i to an adder 42-11 in the IC card 42.

(14) On receiving the sum total value d1 from the register 43-21 in the store transaction terminal 43 at one input terminal, adder 42-11 adds the sum total value d1 to the purchase amount (purchase return and allowance amount) d2 received at the other input terminal, and outputs a sum d1+d2 to coder 42-10.

(15) On receiving the sum d1+d2 from adder 42-11 at one input terminal, coder 42-10 codes the sum d1+d2 into EKB-Ai(d1+d2) by using bank key KB-Ai received at the other input terminal from decoder 42-1", and outputs a coded sum EKB-Ai(d1+d2) to the store transaction terminal 43 for a storage in the register 43-21. The coded sum EKB-Ai(d1+d2) becomes a basis for settlement to be submitted to the bank center 44 of bank A.

Meanwhile, a ledger entry maker 42-13 in the IC card 42 also receives the purchase amount (purchase return and allowance amount) d2. The ledger entry maker 42-13 enters the purchase amount (purchase return and allowance amount) d2 into the debit (credit) side of a ledger in the ledger file 42-14, which calculates a net balance for authorizing a purchase. The holder may continue using the IC card 42 e.g. until the net balance falls to zero [0] or a prescribed revolving limit. Because the ledger file 42-14 controls the sum total of purchase amounts on the debit side separately from the sum total of purchase return and allowance amounts on the credit side, a purchase authorization by a complex formula not limited to a net balance is quite possible. If the ledger file 42-14 does not authorize a purchase, adder 42-11 skips procedure (14).

Procedures (5) through (15) allow the holder of the IC card 42 to use his card for a purchase.

The store transaction terminal 43 settles the sum total value for each customer stored in the register 43-21 at every lapse of certain time period, such as an hour, a day, a week, or a month, by transmitting to the bank center 44 of his bank the sum total value d1 for each customer and the authenticator EKB-Ai(d1+d2).

(16) On receiving the sum total value d1 and the authenticator EKB-Ai(d1+d2), the bank center 44 has its authenticator checker 44-3 check the validity of the authenticator EKB-Ai(d1+d2) by using the new sum total value d1, which has been updated by adding the purchase amount (purchase return and allowance amount) d2 to the old sum total value d1. Upon confirming the validity, the authenticator checker 44-3 supplies the sum total value d1 to a store account file 87, thereby crediting the amounts of sales and debiting the amounts of sales returns and allowances. Because the store transaction terminal 43 does not use bank key KB-Ai, it cannot alter the sum total value d1, which is instrumental in preventing a fraud perpetrated by using the store transaction terminal 43.

The settlement between the IC card 42 and the store transaction terminal 43 and the settlement between the store transaction terminal 43 and the bank center 44 are not limited to the above procedures but can be some others, as described later.

So far, procedures for a money transfer to or from the IC card 42 and a key control for a settlement between the IC card 42 and the store transaction terminal 43 and a settlement between the store transaction terminal 43 and the bank center 44 have been discussed. The principles of this invention will be explained in further detail below.

Figure 7:
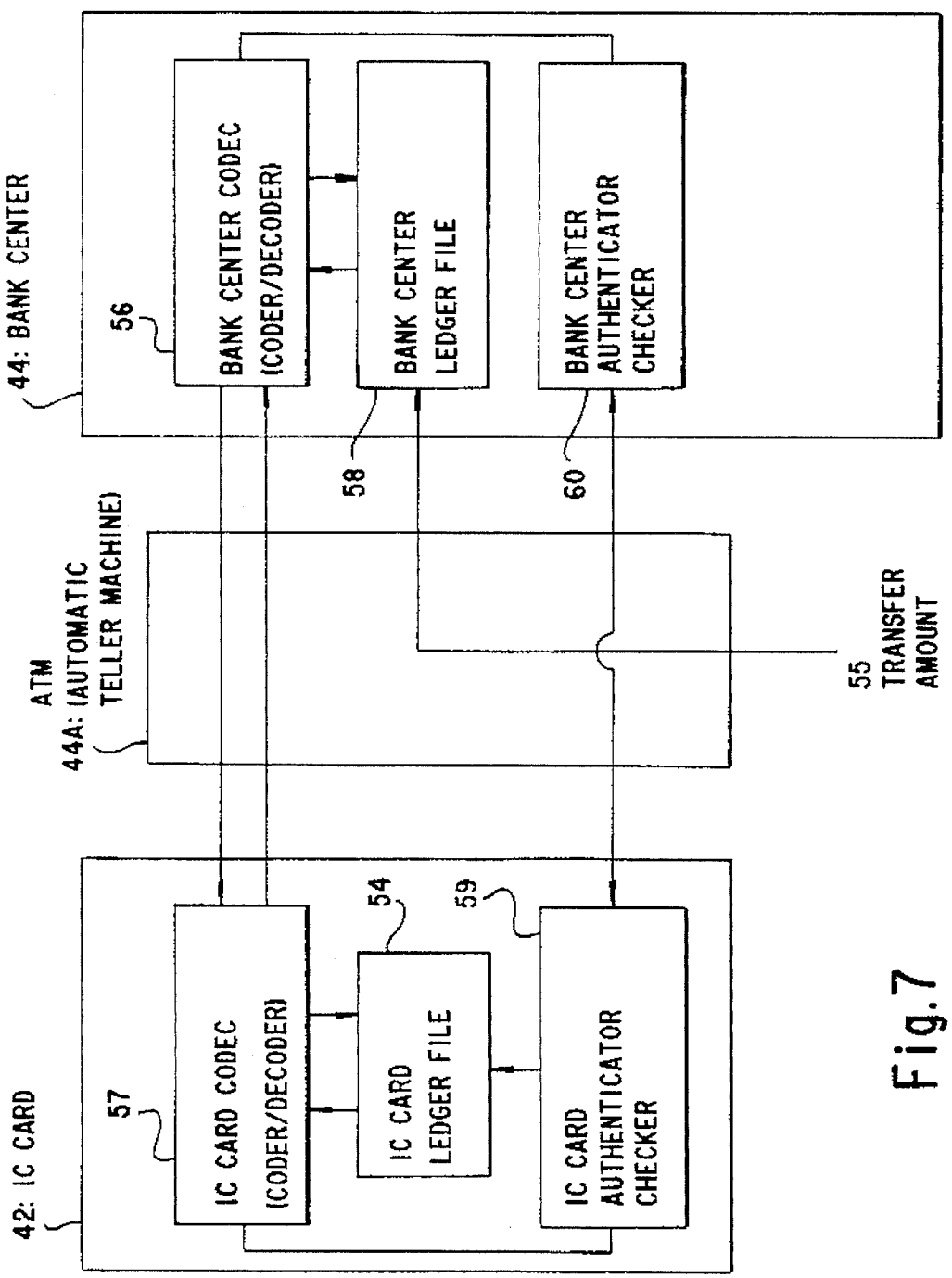
FIG. 7 is a block diagram of a money transfer to or from the IC card 42.

FIG. 7 is a block diagram of a money transfer to or from the IC card 42.

The holder of the IC card 42 wishing to transfer money to or from the IC card 42 inserts the IC card 11 into the ATM 44A after activating the IC card 42 by entering his PW to the IC card 42 e.g. from the keypad of the IC card 42. Alternatively, the holder may activate the IC card 42 by entering his PW e.g. from the touch sensor panel of the ATM 44A after inserting the IC card 42 into the ATM 44A. This allows a communications link to be established between the IC card 42 and the bank center 44 via the ATM 44A.

Then, the holder of the IC card 42 inputs a transfer amount 55 (which is defined as being positive for a transfer-in to the IC card 42 and being negative for a transfer-out from the IC card 42) e.g. from the keyboard of the ATM 44A. Alternatively, the holder of the IC card 42 can input the transfer amount 55 from the keypad of the IC card 42 before he inserts his card to the ATM 44A.

The bank center 44 comprises a bank center CODEC (coder/decoder) 56 having a single master key L for coding data transmitted from the bank center 44 via the ATM 44A to the IC card 42 and for decoding data transmitted from the IC card 42 via the ATM 44A to the bank center 44.

The IC card 42 comprises an IC card CODEC 57 sharing with the bank center CODEC 56 the same master key L for decoding data transmitted from the bank center 44 via the ATM 44A to the IC card 42 and for coding data transmitted from the IC card 42 via the ATM 44A to the bank center 44.

The bank center 44 also comprises a bank center ledger file 58, which receives from the ATM 44A the transfer amount 55 specified by the holder of the IC card 42. The bank center 44 determines whether or not it can approve a money transfer according to a prescribed formula for a transfer-in to (or transfer-out from) the IC card 42, on receiving a request for moving a transfer amount 55. If the bank center 44 can approve the money transfer, the bank center 44 debits (credits) the transfer amount 55 to the account balance stored in the bank center ledger file 58 and credits (debits) the same to the account balance stored in the IC card ledger file 54.

The IC card 42 comprises an IC card authenticator checker 59 for determining, by transmitting query data to a communicant and receiving response data from the communicant, whether or not the communicant is duly the bank center 44, before allowing a money transfer. The IC card 42 and the bank center 44 allow new entries to be made respectively to the IC card ledger file 54 and the bank center ledger file 58.

The bank center 44 comprises the bank center authenticator checker 60 for receiving query data from the IC card authenticator checker 59 and for returning response data to the same, thereby proving the authenticity.

The holder of the IC card 42 wishing to transfer money to or from the IC card 42 inserts the IC card 42 into the ATM 44A after activating the IC card 42 by entering his PW to the IC card 42 e.g. from the keypad of the IC card 42. Alternatively, the holder may activate the IC card 42 by entering his PW e.g. from the touch sensor panel of the ATM 20 after inserting the IC card 42 into the ATM 44A, as described earlier.

That is, an insertion of the IC card 42 after being activated into the ATM 44A allows a communications link to be established between the IC card 42 and the bank center 44 via the ATM 44A. This activates the bank center CODEC 56. The bank center 44 creates a session key proprietary to the communications session by using the master key L held by the bank center CODEC 56. The bank center 44 sends to the IC card 42 a key (randomly generated number) for creating a session key. On receiving the key (randomly generated number) from the bank center 44, the IC card 42 activates the IC card CODEC 57 for reconstructing, from the key (randomly generated number), the same session key coded by the bank center CODEC 56 by using the master key L it shares with the bank center 44.

Thereafter, the bank center CODEC 56 and the IC card CODEC 57 code and decode communications data exchanged between the IC card 42 and the bank center 44 by using the session key.

The bank center 44 then activates the bank center ledger file 58, which receives as one input the transfer amount 55 from the IC card 42 via the ATM 44A. Further, the IC card 42 reads the balance data stored in the IC card ledger file 54. Then, the IC card 42 has the IC card CODEC 57 code the balance data stored in the IC card ledger file 54 by using the session key and sends the coded balance data via the ATM 44A to the bank center 44. The bank center 44 has the bank center CODEC 56 decode the coded balance data received from the IC card 42 via the ATM 44A by using the session key and supplies the decoded balance data to the bank center ledger file 58. The bank center 44 has the bank center ledger file 58 debit (or credit) the transfer amount 55 for a transfer-out (or a transfer-in).

Then, the bank center 44 may send via the ATM 44A to the IC card 44 the transfer amount 55 by coding it by using the session key, in which case the IC card 42 has the IC card CODEC 57 decode the transfer amount 55 being coded by using the session key and has the IC card ledger file 54 credit (or debit) the transfer amount 55.

Alternatively, the bank center 44 may have the bank center ledger file 58 credit (or debit) the transfer amount 55 to a current balance stored in the IC card ledger file 54, thereby obtaining a new balance to be stored in the IC card 42, and have the bank center CODEC 56 code the new balance to be stored in the IC card 42 by using the session key for a transmission via the ATM 44A to the IC card 42, in which case the IC card 42 has the IC card CODEC 57 decode the new balance being coded by using the session key and has the IC card ledger file 54 store the new balance.

These procedures complete a transfer-in to (or a transfer-out from) the IC card 42.

The above procedures, however, have a weakness in allowing money to be transferred fraudulently if the key (randomly generated number) supplied by the bank center CODEC 56 for creating a session key is intercepted during its transmission from the bank center 44 to the IC card 42. Hence, as a precaution, the IC card authenticator checker 59 and the bank center authenticator checker 60 are added.

To do so, before having the IC card ledger file 54 store the decoded new balance, the IC card 42 activates the IC card authenticator checker 59. The IC card authenticator checker 59 sends query data to the bank center 44 for determining whether the communicant is indeed the bank center 44. On receiving the query data from the IC card 42, the bank center 44 has its bank center authenticator checker 60 sends response data to the IC card 42. On receiving the response data from the bank center 44, the IC card 42 has its IC card authenticator checker 59 determine whether the communicant is indeed the bank center 44. Only when the response data properly identifies the communicant as the bank center 44 does the IC card 42 allow the IC card ledger file 54 to store the new balance, thereby preventing the IC card ledger file 54 from receiving fake data.

Figure 8:
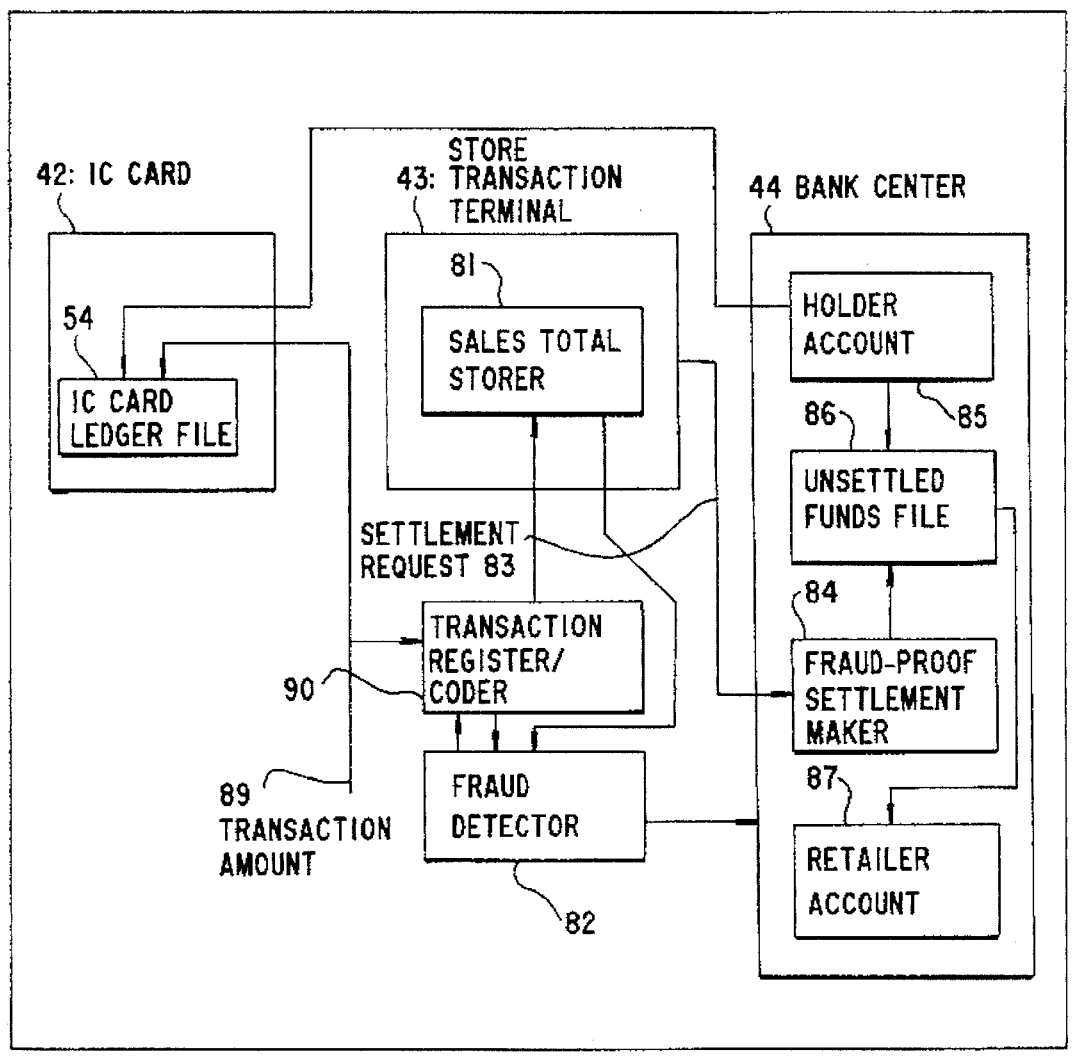
FIG. 8 is a block diagram illustrating a sales data updation and a sales billing.

FIG. 8 is a block diagram illustrating a sales data updation and a sales billing.

A transaction register/coder 90, provided either in the store transaction terminal 43 or the IC card 42, updates the total sales (or the total sales returns and allowances) by adding a transaction amount 89 and codes the updated total sales (total sales returns and allowances) by using a bank key. The transaction amount 89 is an amount of sales (or sales returns and allowances) for a seller (i.e. a participating store having the store transaction terminal 43) and an amount of purchases (purchases returns and allowances) for a buyer (i.e. a holder of the IC card 42). The transaction register/coder 90 may code updated total sales (updated total sales returns and allowances) through the use of either an authenticator generation method whereby a part of the ordinary data are coded or a full coding method coding all of the ordinary data are coded.

When the IC card 42 comprises the transaction register/coder 59, because a bank key used for coding is bank-specific, the bank key of a home bank of the IC card 42 cannot work with the code of some other IC cards issued by foreign banks. Such data as on the amounts of total sales (or total sales returns and allowances), a serial number equal to the number of settlement requests to the bank center 44 and the date and time of starting to register the total sales (or total sales returns and allowances) are coded for preventing data from being counterfeited at the store transaction terminal 43 by copying data on total sales (or total sales returns and allowances) for another period whose settlement request was made at a different time. Also, an addition of identification data proprietary to the store transaction terminal 43 to the data to be coded is effective in preventing data from being counterfeited at the store transaction terminal 43 by copying data on total sales (or total sales returns and allowances) and their coded data (or their authenticator) from store transaction terminals of foreign stores.

The store transaction terminal 43 has a sales total storer 81 store data on the total sales (or total sales returns and allowances) and the coded total sales amount obtained by the transaction register/coder 90.

A fraud detector 82 can be provided either in the store transaction terminal 43 or the IC card 42. Each time the store transaction terminal 43 executes a transaction with the IC card 42, the fraud detector 82 acts before the transaction register/coder 90 updates and codes the total sales (or total sales and returns). The fraud detector 82 extracts from the total sales storer 81 both the ordinary data on the total sales (or total sales returns and allowances) and the coded data on the total sales (or total sales returns and allowances), and then codes the ordinary data by using the bank key for a comparison with the coded data extracted from the total sales storer 81. If the comparison indicates a match, the fraud detector 82 determines the absence of a fraud, whereas, if the comparison indicates a mismatch, the fraud detector 82 determines an illicit conversion of data on the total sales (or total sales returns and allowances) stored in the sales total storer 81.

The bank center 44 comprises a fraud-proof settlement maker 84, which determines the absence or presence of a fraud, on receiving a settlement request 83 from the store transaction terminal 43. The fraud-proof settlement maker 84 makes a settlement if a fraud is absent, and does not make a settlement if a fraud is present. On receiving from the store transaction terminal 43 the data on the total sales (or the total sales returns and allowances) stored in the sales total storer 81 and their coded data, the fraud-proof settlement maker 84 codes the data on the total sales by using the bank key for a comparison with their coded data received from the store transaction terminal 43. If the comparison indicates a match, the fraud-proof settlement maker 84 determines the absence of a fraud, whereas, if the comparison indicates a mismatch, the fraud-proof settlement maker 84 determines the presence of a fraud.

The fraud-proof settlement maker 84 determines a presence or an absence of a discrepancy in a serial number indicating the number of settlement requests, a date and time of starting to register the total sales (or total sales and allowances), and an identification number of the store transaction terminal 43, when these are added to the total sales (or total sales returns and allowances) as data to be coded. If a discrepancy is present, the fraud-proof settlement maker 84 determines that a fraud is present. If a discrepancy is absent, the fraud-proof settlement maker 84 determines that a fraud is absent, and continues on to a detection of a fraud by a match or a mismatch of the coded data.

The bank center 44 issuing the IC card 42 to its holder and networking with a participating store having the store transaction terminal 43 has a holder account 45 for the holder and a store account 47 for the participating store.

When a holder of the IC card 42 uses his card initially or replenishes a depleted amount to his card, he must transfer-in an amount to the IC card 42 e.g. from his other account. Likewise, when a holder of the IC card 42 divests an excess amount from his card, he must transfer-out an amount from the IC card 42 e.g. to his other account.

The bank center 44 authorizing a transfer-in to the IC card 42 from his other account, e.g. when a requested amount of transfer-in does not exceed the sum of the revolving limit and the outstanding balance of the holder account 45, credits the requested amount to the IC card ledger file 54 in the IC card 42, and debits the same to the holder account 45.

Upon a lapse of every predetermined period of time, which corresponds to a billing cycle the store transaction terminal 43 calculates total sales (or total sales returns and allowances) for the predetermined billing cycle, and bills the total sales (or total sales returns and allowances) to the bank center 44 as a settlement request 83. At the inception of every billing cycle, the total sales are initialized to zero [0].

The holder of the IC card 42 wishing to transact (make a purchase or rescind a purchase) with a participating store by using the IC card 42 inserts the IC card 42 into the store transaction terminal 43 after confirming the amount of purchases (or purchases returns and allowances) displayed on a monitor screen of the store transaction terminal 43 and activating the IC card 42 by entering his PW to the IC card 42 e.g. from the keypad of the IC card 42.

Alternatively, the holder may activate the IC card 42 by entering his PW e.g. from the touch sensor panel of the store transaction terminal 43 after confirming the amount of purchases (or purchases returns and allowances) displayed on a monitor screen of the store transaction terminal 43 and inserting the IC card 42 into the store transaction terminal 43.

When the holder activates the IC card 42, the transaction register/coder 90, which is provided either in the store transaction terminal 43 or the IC card 42, is also activated.

First, a case is considered in which the transaction register/coder 90 is provided in the store transaction terminal 43.

At the beginning of every predetermined period of time, when the total sales are initialized to zero [0], as described earlier. When the store transaction terminal 43 makes a first transaction for a predetermined period of time with the IC card 42, the transaction register/coder 90 codes the transaction amount 89 as the total sales (or total sales returns and allowances) by using the bank key stored in the store transaction terminal 43.

Then, the transaction register/coder 90 sends to the sales total storer 81 data on the total sales (or total sales returns and allowances) and their coded data. The store transaction terminal 43 has the sales total storer 81 store the data on the total sales (or total sales returns and allowances) and their coded data supplied from the transaction register/coder 90.

The IC card inserted in the store transaction terminal 43 updates data in the IC card ledger file 54 by debiting (or crediting) the transaction amount 89 for a purchase (or a purchase return).

When a next holder wishing to make a purchase with his IC card 42 visits the participating store, he activates his card in a manner similar to the above. When the holder activates the IC card 42, the transaction register/coder 90 is also activated. Since this is not the first transaction for the predetermined period of time, a fraud detector 82 is activated before the transaction register/coder 90 begins its processes. As with the transaction register/coder 90, the fraud detector 82 can be provided either in the store transaction terminal 43 or the IC card 42. It is assumed here that e fraud detector is provided in the store transaction terminal 43.

The fraud detector 82 reads from the sales total storer 81 the data on the total sales (or total sales returns and allowances) and their coded data (or their authenticator) and checks their consistency. That is, the fraud detector 82 codes the data on the total sales (or total sales returns and allowances) by using the same bank key as that used by the transaction register/coder 90 for checking their match with the coded data (or authenticator) read from the sales total storer 81. When the fraud detector 82 reads coded data from the sales total storer 81, it may decode the coded data by using the same bank key for checking their match with the data on the total sales (total sales returns and allowances) read from the sales total storer 81. If a comparison indicates no discrepancy, the fraud detector 82 determines the absence of a fraud, whereas if a comparison indicates a discrepancy, the fraud detector 82 determines the presence of a fraud. On determining that the fraud is absent, the fraud detector 82 causes the transaction register/coder 90 to start its processes. On determining that the fraud is present, the fraud detector 82 notifies the bank center 44 of the effect and terminates its processes without causing the transaction register/coder 90 to start its processes.

When the fraud detector 90 does not detect a fraud, the transaction register/coder 90 updates data on the total sales (or total sales returns and allowances) by crediting (or debiting) the transaction amount 89 to the data on the total sales (or total sales returns and allowances) read from the sales total storer 81, and codes updated data on the total sales (or total sales returns and allowances) by using the bank key for a transmission to the sales total storer 81 in the store transaction terminal 43.

A repetition of the above procedures for a non-initial transaction enables the total sales (total sales returns and allowances) within a predetermined period of time to be cumulatively calculated.

After a lapse of the predetermined period of time, the store transaction terminal 43 sends to the bank center 44 a settlement request 83. On receiving the settlement request 83, the bank center 44 activates the fraud-proof settlement maker 84.

The fraud-proof settlement maker 84 reads from the sales total storer 81 the data on the total sales (or total sales returns and allowances) and their coded data (or their authenticator) and checks their consistency. That is, the fraud-proof settlement maker 84 codes data on the total sales (or total sales returns and allowances) stored in the bank center ledger file 58 of the bank center 44 by using the same bank key as that used by the transaction register/coder 90 for checking their match with the coded data (or authenticator) read from the sales total storer 81. When the fraud-proof settlement maker 84 reads coded data from the sales total storer 81, it may decode the coded data by using the same bank key for checking their match with the data on the total sales (total sales returns and allowances) read from the sales total storer 81. If a comparison indicates no discrepancy, the fraud-proof settlement maker 84 determines the absence of a fraud, whereas if a comparison indicates a discrepancy, the fraud-proof settlement maker 84 determines the presence of a fraud. On determining that the fraud is absent, the fraud-proof settlement maker 84 accepts the settlement request 83 by debiting the unsettled funds file 86 and crediting the store account file 87. On determining that the fraud is present, the fraud-proof settlement maker 84 rejects the settlement request 83.

Although the above description is for a case in which both the transaction register/coder 90 and the fraud detector 82 are provided in the store transaction terminal 43, it is possible that at least one [1] of them are provided in the IC card 42, for preventing a fraud by interpreting a bank key, with similar operations.

Such data as on a serial number equal to the number of settlement requests to the bank center 44 and the date and time of starting to register the amounts of total sales (or total sales returns and allowances), in addition to data on the amount of total sales (or total sales returns and allowances), may be coded for preventing data from being counterfeited at the store transaction terminal 43 by copying data, stored in the sales total storer 81, on the amounts of total sales (or total sales returns and allowances) for another period whose settlement request was made at a different time. In this case, the fraud-proof settlement maker 84 in the bank center 44 checks a consistency in data on the serial number and on the date and time, and codes the data on the total sales (or total sales returns and allowances) including data on the serial number and the date and time for its comparison with coded data transmitted in the settlement request 83, thereby examining an absence or presence of a fraud.

Also, an addition of identification data proprietary to the store transaction terminal 43 to the data to be coded is effective in preventing data from being counterfeited at the store transaction terminal 43 by copying data on the amounts of total sales (or total sales returns and allowances) and their coded data (or their authenticator) from store transaction terminals of foreign stores. In this case, the transaction register/coder 90 codes the identification data proprietary to the store transaction terminal 43 as well as the data on the amounts of total sales (or total sales returns and allowances). The fraud-proof settlement maker 84 in the bank center 44 detects a fraud by checking whether or not more than one [1] settlement request 83 from the store transaction terminal 43 has the same identification of the store transaction terminal 43. On determining that the settlement request 83 is singular, the data on the amounts of total sales (or total sales and allowances) and the identification of the store transaction terminal 43 are coded for a comparison with coded data transmitted in the settlement request 83, thereby determining a presence or an absence of a possible fraud.

Described below are embodiments of an electronic cashless transaction medium, whose outlines, including key controls, money transfers, and an updation of sales data and sales billing, have been described above.

As described earlier, the key control of the electronic cashless transaction medium of this invention comprises a process of supplying a key creating parameter via the ATM 44A to the IC card 42, a process of supplying a key creating parameter via the store transaction terminal 43 to the IC card 42, and a process of supplying a coding session key via the store transaction terminal 43 to the IC card 42, each of which will be described in detail below.

Figure 9:
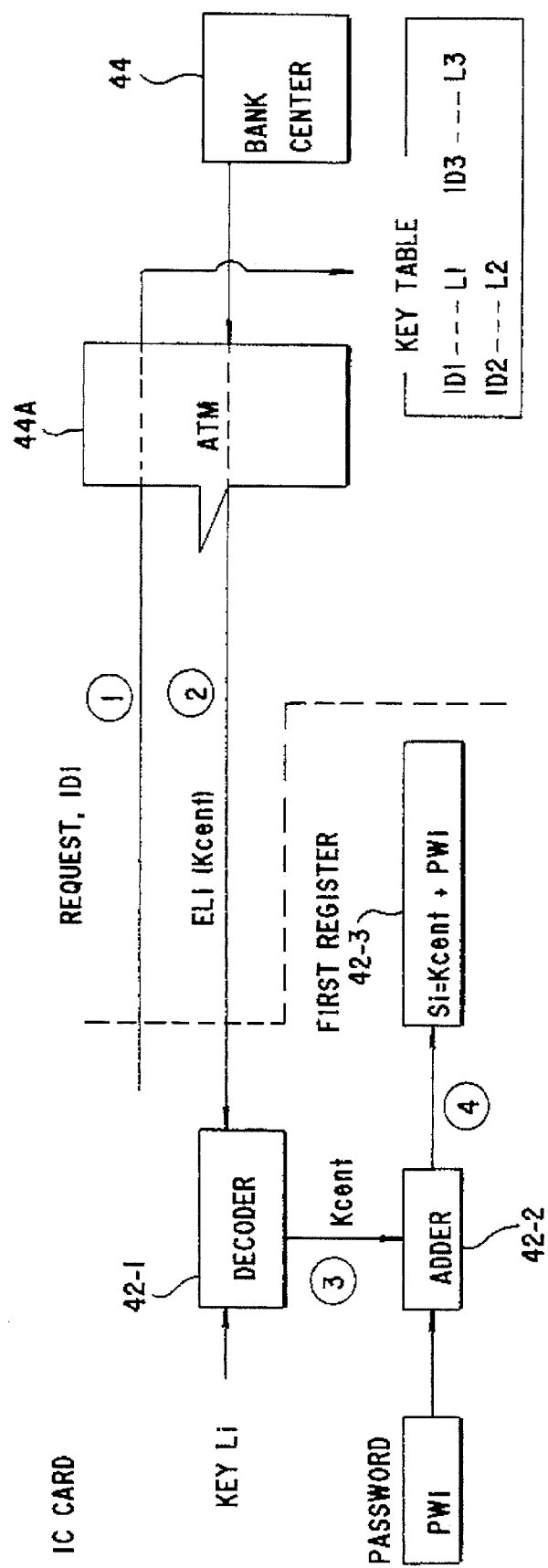
FIG. 9 shows a process of supplying via the ATM 44A to the IC card 42 the first parameter Kcent necessary for creating a key KIDi for decoding a variable bank key KB.

FIG. 9 shows a process of supplying via the ATM 44A to the IC card 42 the first parameter Kcent necessary for creating a key KIDi for decoding a variable bank key KB.

(1) A holder having an identification number IDi of the IC card 42 inserts his own card into the ATM 44A.

(2) The IC card 42 automatically sends the identification number IDi to the bank center 44, which searches for a holder communications key L1 by using the identification number IDi as an address of a key table. The bank center 44 uses the holder communications key Li for coding the first parameter Kcent, which is a secret random number, and sends the coded first parameter ELi(Kcent) via the ATM 44A to the IC card 42. This prevents an illicit data conversion along the communications link between the bank center 44 and the ATM 44A.

(3) The IC card 42 has its decoder 42-1 decode the coded first parameter ELi(Kcent) by using an internal card key Li, thereby reconstructing the first parameter Kcent.

(4) Then, the IC card 42 has its adder 42-2 add a number obtained from a password PWi to the decoded first parameter Kcent, thereby creating a second parameter Si (=Kcent+PWi) for storage in its register 42-3.

Figure 10:
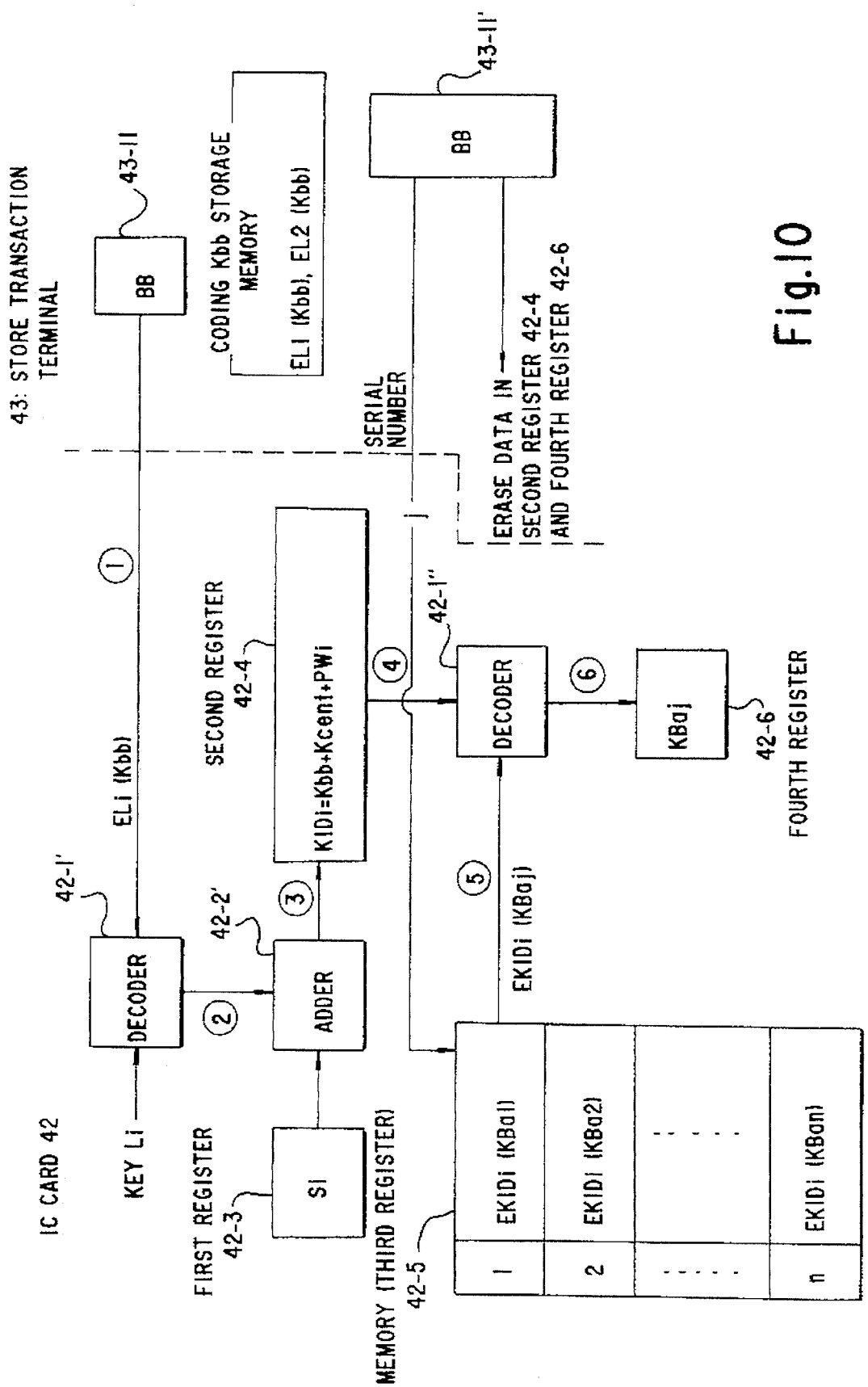
FIG. 10 shows processes between the IC card 42 and the store transaction terminal 43 executed when a holder and a participating store executes a transaction.

FIG. 10 shows processes between the IC card 42 and the store transaction terminal 43 executed when a holder and a participating store executes a transaction.

(1) When the holder inserts the IC card 42 into the store transaction terminal 43, the IC card 42 automatically transmits its identification number to the store transaction terminal 43, which causes the store transaction terminal 43 to have its security black box (BB) 43-11 supply a coded second parameter ELi(Kbb) obtained by coding a second parameter Kbb by using a key Li. The bank center 44 supplies the coded second parameter ELi(Kbb) in advance to the store transaction terminal 43.

(2) The IC card 42 has its decoder 42-1' decode the coded second parameter ELi(Kbb1) by using an internally stored key Li, thereby reconstructing the second parameter Kbb.

(3) The IC card 42 has its adder 42-2' add the second parameter Kbb to the first variable Si stored in the first register 42-3, thereby obtaining a sum KIDi (=Kbb+Kcent+PWi).

(4) The store transaction terminal 43 has its security black box (BB) 43-11' send a serial number j to the IC card 42.

(5) On receiving the serial number j, the IC card 42 has its memory (third register) 42-5 search for a coded j-th bank key KBaj being coded by key KIDi.

(6) The IC card 42 has its decoder 42-1" decode the j-th bank key KBaj by using key KIDi, thereby reconstructing the j-th bank key KBaj.

More specifically, the IC card 42 has its ROM store key Li, and uses battery backed up registers for the first register 42-3 for storing LBaj and the memory (third register) 42-5, non backed up registers for the second register 42-4 for storing KIDi and the second register 42-6 for storing KBaj. The contents of the second register 42-4 and the fourth register 42-6 are erased by an instruction of the store transaction terminal 43 upon consummation of a transaction.

Figure 11:
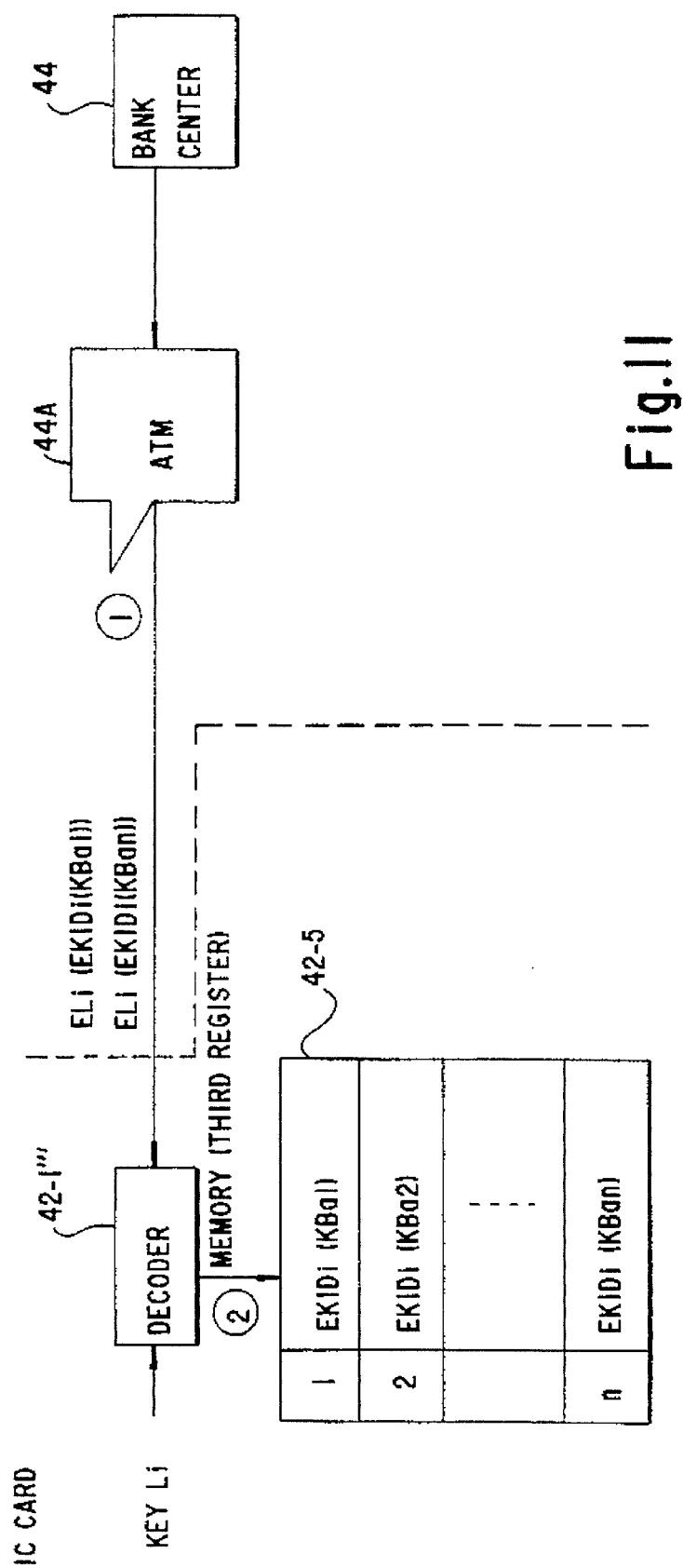
FIG. 11 shows processes between the IC card 42 and the bank center 44 when the bank center 44 supplies to a holder a key for transferring money.

FIG. 11 shows processes between the IC card 42 and the bank center 44 when the bank center 44 supplies to a holder a series of coding bank keys for transferring money.

(1) The bank center 44 supplies to the IC card 42 inserted in the ATM 44A a coded series of coding session keys ELi(EKIDi(KBa1)) through ELi(EKIDi(KBan)) being coded by key Li.

(2) The IC card 42 has its decoder 42-1''' decode the coded series of coding bank keys ELi(EKIDi(KBa1)) through ELi(EKIDi(KBan)) by using key Li, thereby reconstructing a series of coding bank keys EKIDi(KBa1) through EKIDi(KBan), and has its memory (third register) 42-5 store the series of coding bank keys EKIDi(KBa1) through EKIDi(KBan).

Then, the IC card 42 has its decoder 42-1'' decode the series of coding bank keys EKIDi(KBa1) through EKIDi(KBan), thereby obtaining a series of session keys KBa1 through KBan.

Figure 12:
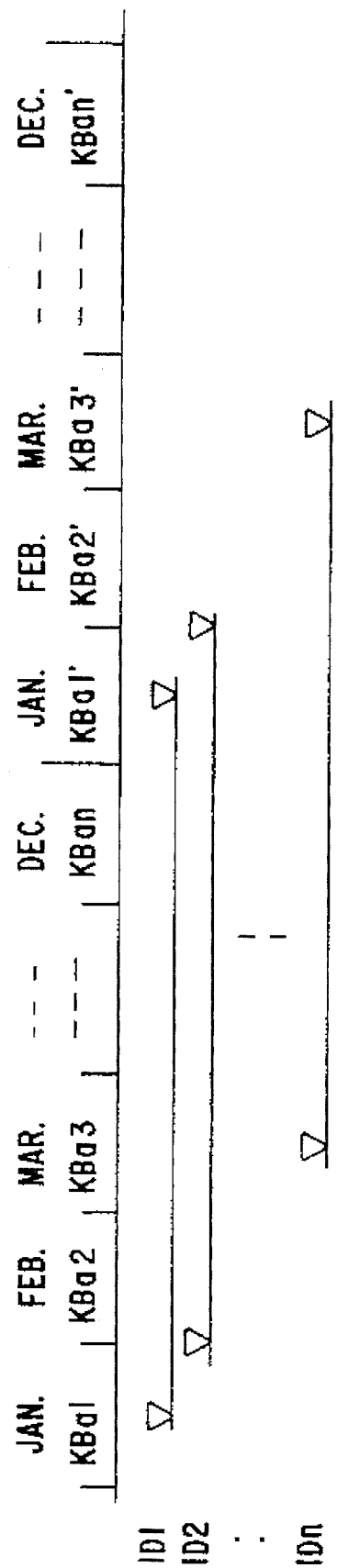
FIG. 12 shows exemplary cycles of changing a series of coding session keys KBa1 through KBan supplied to a holder.

FIG. 12 shows exemplary cycles of changing a series of coding session keys KBa1 through KBan supplied to a holder.

As described above, the bank center 44 may supply a coded series of coding bank keys ELi(EKIDi(KBa1)) through ELi(EKIDi(KBan)) for creating a series of coding session keys EKIDi(KBa1) through EKIDi(KBan), valid for a certain duration (e.g. a few hours, a day, a week, a month, a quarter and a year). FIG. 12 illustrates an example in which the certain period of time is a year.

The bank center 44 may also supply to store transaction terminal 43 a coded series of second coding parameters Kbb coded by using the master key L, valid for a certain duration (e.g. a few hours, a day, a week, a month, a quarter and a year).

As described above, an introduction to an electronic cashless transaction medium of a mechanism for creating a bank key (master key) stored internally in the IC card 42 e.g. corresponding to the personal identification of a holder and the time of issuing the IC card 42 enables a bank key to be variably customized, which contributes greatly to an enhancement of the system security against a possible counterfeit.

Figure 13:
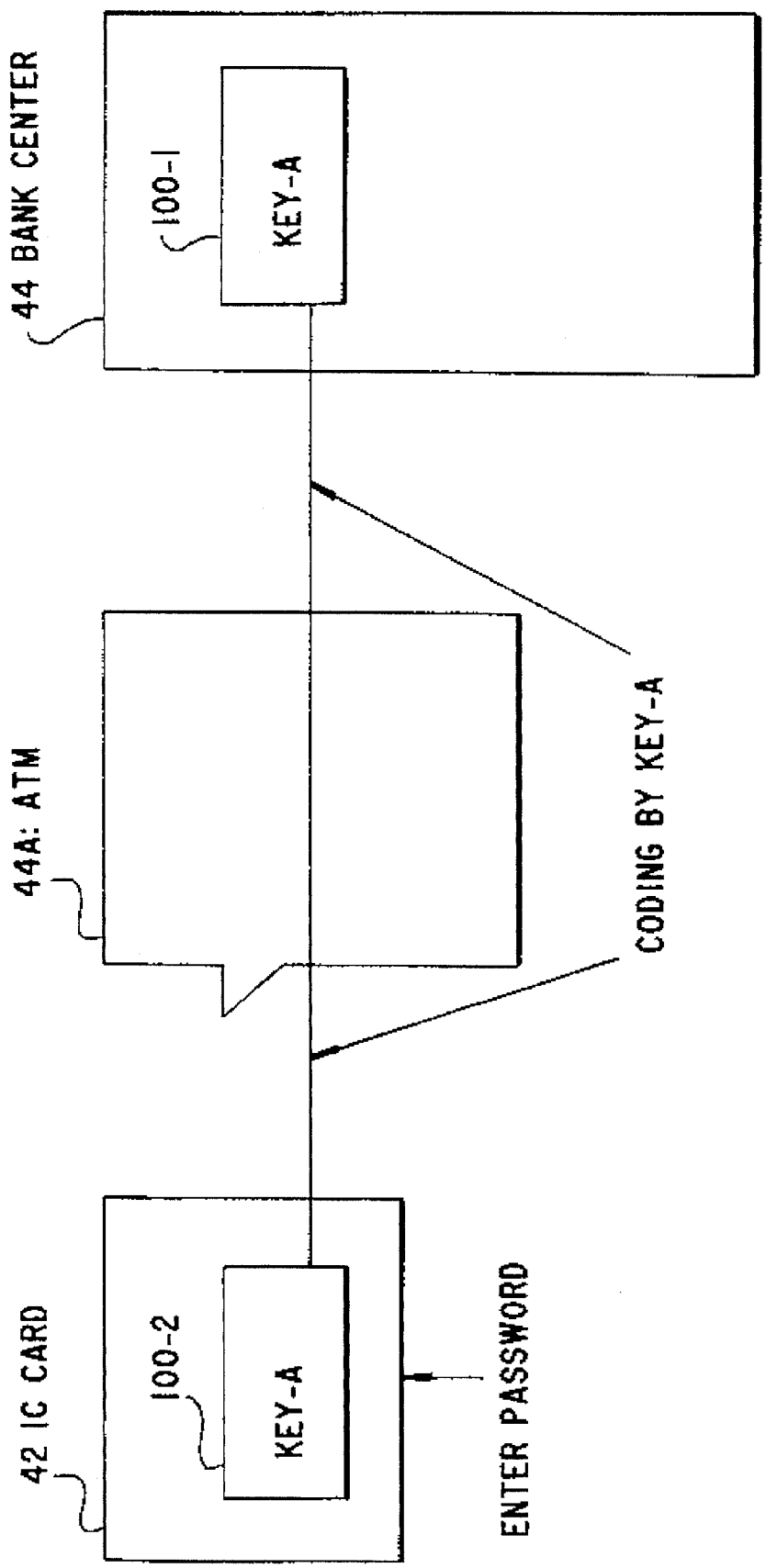
FIG. 13 is a sketch of a second embodiment of this invention.

FIG. 13 is a sketch of a second embodiment of this invention.

A system of the second embodiment also comprises the IC card 42, the ATM 44A, the bank center 44. The bank center 44 and the IC card 42 share a key-A 100 for coding and decoding the communications data between the IC card 42 and the bank center 44. Thus, the ATM 44A becomes merely a repeater on the communications link between the bank center 44 and the IC card 42.

Figure 14:
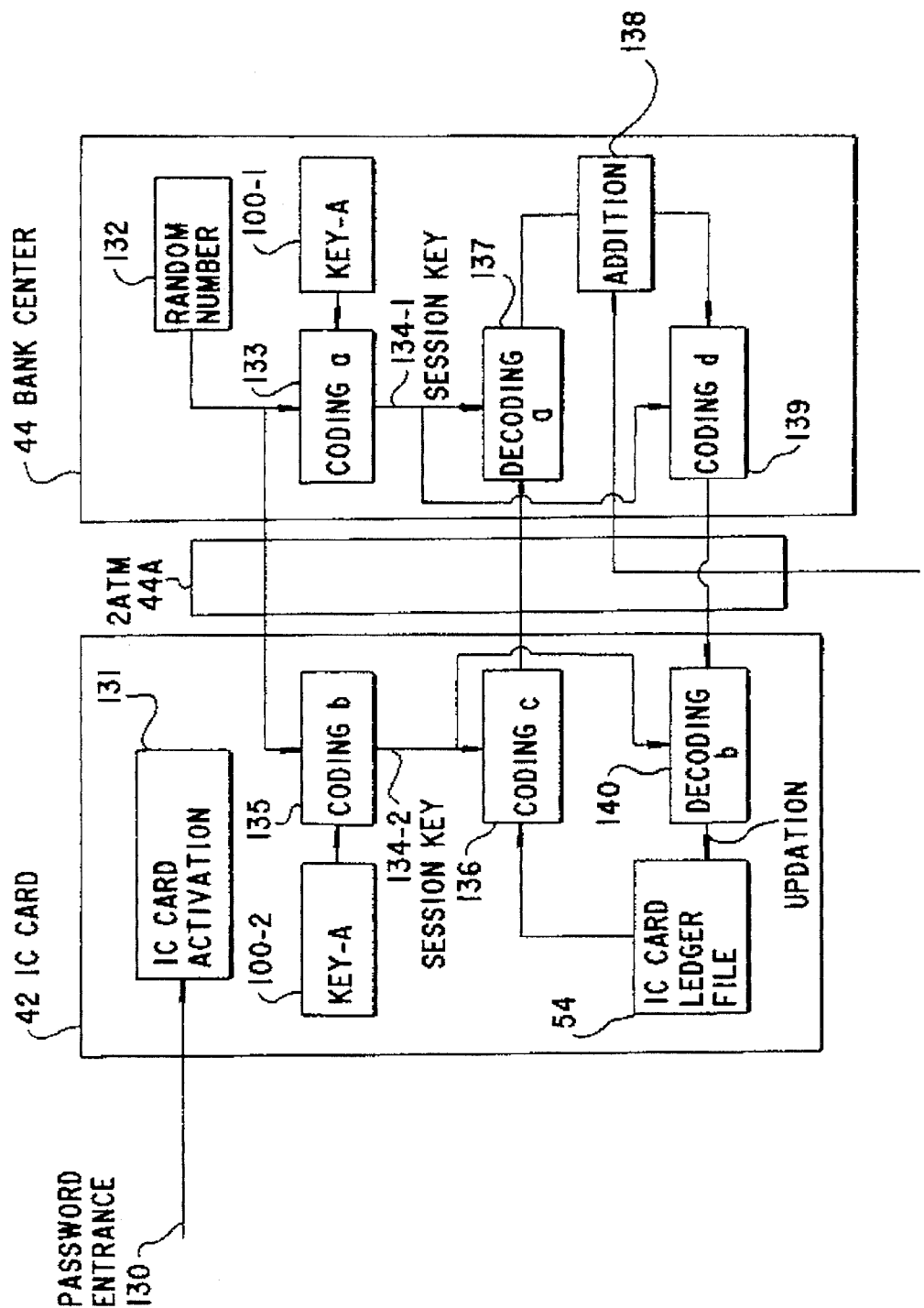
FIG. 14 is a block diagram of the second embodiment of this invention.

FIG. 14 is a block diagram of the second embodiment of this invention.

A holder of the IC card 42 wishing to transfer money between the IC card 42 and his other accounts inserts his card into the ATM 44A after activating the IC card 42 by entering his password (PW) 130 to the IC card 42 e.g. from the keypad of the IC card 11. Alternatively, the holder may activate the IC card 42 by entering his PW e.g. from the touch sensor panel of the ATM 44A after inserting the IC card 11 into the ATM 44A. This allows a communications link to be established between the IC card 42 and the bank center 44 via the ATM 44A.

Then, the holder of the IC card 42 inputs a transfer amount 55 (which is defined as being positive for a transfer-in to the IC card 42 and being negative for a transfer-out from the IC card 42) e.g. from the keyboard of the ATM 44A. Alternatively, the holder of the IC card 42 can input the transfer amount 55 from the keypad of the IC card 42 before he inserts his card to the ATM 44A.

On establishing the communications link with the IC card 42, the bank center 44 generates a random number 132, and codes the random number 132 by using a key-A 100-1 (coding a133), thereby creating a session key 134-1. The bank center 44 sends via the ATM 44A to the IC card 42 the random number 132. The IC card 42 codes the random number 132 by using a key 100-2 (coding b135), thereby creating a session key 134-2.

Then, the IC card 42 codes the balance data stored in the IC card ledger file 54 by using a session key 134-2 (coding c136) for a transmission to the bank center 44 via the ATM 44A. The bank center 44 decodes the coded balance data by using a session key 134-1 (decoding a137), thereby reconstructing the balance data. The bank center 44 adds the balance data to the transfer amount 55 the holder inputs via the ATM 44A (138), thereby obtaining new balance data. Then, the bank center 44 codes the new balance data (coding d139) by using the session key 134-1 for a transmission via the ATM 44A to the IC card 42. The IC card 42 decodes the coded new balance data by using the session key 134-2 (decoding b140), thereby reconstructing the new balance data, and rewrites the content of the IC card ledger file 54 by the new balance data.

The above processes enable a money transfer to or from the IC card 42. Therefore, the ATM 44A becomes merely a repeater on the communications link between the bank center 44 and the IC card 42. A new session key created each time a holder of the IC card 42 transfers money between his other accounts and his card works as an effective defense against eavesdropping such as at the ATM 44A.

However, if the random number generated by the random number generator 44-2 of the bank center 44 is known, it becomes possible to write fake data by connecting a fictitious bank center by using the same random number.

Figure 15:
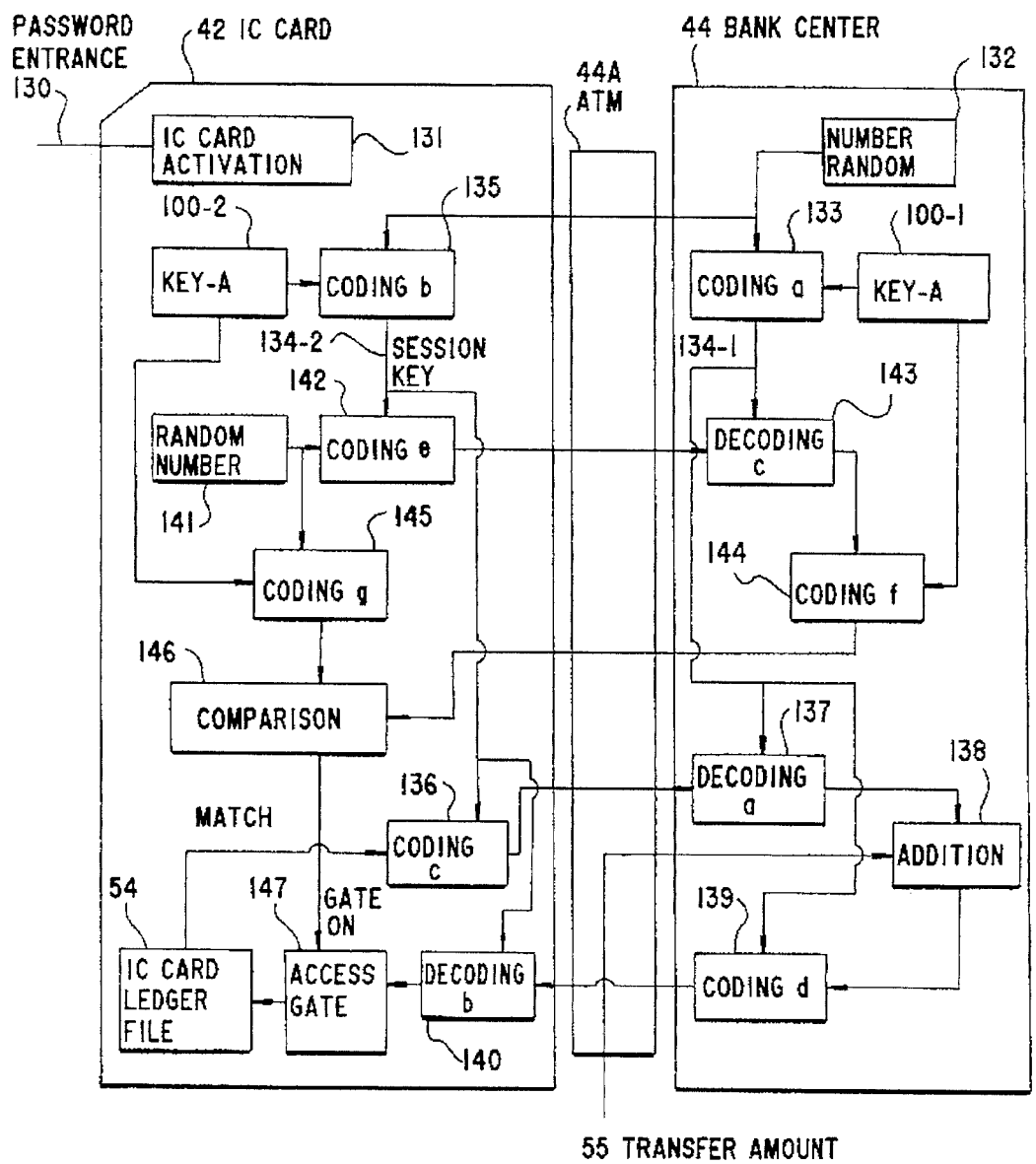
FIG. 15 is a block diagram of the second embodiment modified for preventing a fraud.

FIG. 15 is a block diagram of the second embodiment modified for preventing a fraud.

A holder of the IC card 42 wishing to transfer money between the IC card 42 and his other accounts inserts his card into the ATM 44A after activating the IC card 42 by entering his password (PW) 130 to the IC card 42 e.g. from the keypad of the IC card 11. Alternatively, the holder may activate the IC card 42 by entering his PW e.g. from the touch sensor panel of the ATM 44A after inserting the IC card 11 into the ATM 44A. This allows a communications link to be established between the IC card 42 and the bank center 44 via the ATM 44A.

Then, the holder of the IC card 42 inputs a transfer amount 55 (which is defined as being positive for a transfer-in to the IC card 42 and being negative for a transfer-out from the IC card 42) e.g. from the keyboard of the ATM 44A. Alternatively, the holder of the IC card 42 can input the transfer amount 55 from the keypad of the IC card 42 before he inserts his card to the ATM 44A.

On establishing the communications link with the IC card 42, the bank center 44 generates a random number 132, and codes the random number 132 by using a key-A 100-1 (coding a133), thereby creating a session key 134-1. The bank center 44 sends via the ATM 44A to the IC card 42 the random number 132. The IC card 42 codes the random number 132 by using a key 100-2 (coding b135), thereby creating a session key 134-2.

Initial operations of the modified form of the second embodiment shown in FIG. 15 up to this point are the same as those of the original form of the second embodiment shown in FIG. 14.

Then, the IC card 42 generates a random number 141, and codes the random number 142 by using the session key 134-2 (coding e142) for a transmission via the ATM 44A to the bank center 44.

On receiving the coded random number from the IC card 42, the bank center 44 decodes it by using the session key 134-1 (decoding c143) and codes it by using the KEY-A 100-1 (coding f144) for a transmission via the ATM 44A to the IC card 42.

The IC card 42 codes the random number 141 by using the KEY-A 100-2 (coding e145) for a comparison 146 with the coded random number outputted in f144 and received from the bank center 44. The IC card 42 determines that it indeed communicates with the bank center 44 if they match, or determines that it does not in fact communicate with the bank center 44 and terminates its processes for transferring money if they do not match.

If the IC card 42 determines a genuine communication with the bank center 44 by a match resulting from the comparison 146, the IC card 42 has its IC card ledger file 54 update its data by turning ON an access gate 147 of the IC card ledger file 54. Then, the IC card 42 codes the balance data hitherto stored in the IC card ledger file 54 by using the session key 134-2 (coding c136) for a transmission via the ATM 44A to the bank center 44.

The bank center 44 decodes the coded balance data by using the session key 134-1 (decoding a137) for an addition (138) to data on the transfer amount 55 the holder inputs to the ATM 44A, thereby obtaining new balance data. The bank center 44 codes the new balance data by using the session key 134-1 (coding d139) for a transmission to the IC card 42 via the ATM 44A.

The IC card 42 decodes the coded new balance received from the bank center 44 via the ATM 44A, thereby reconstructing the new balance data for storage in the IC card ledger file 54 via the access gate 147 being turned ON.

The above procedures, consummating a money transfer between the IC card 42 and other accounts of the holder at the bank center 44, are very effective in enhancing a system security.

Figure 16:
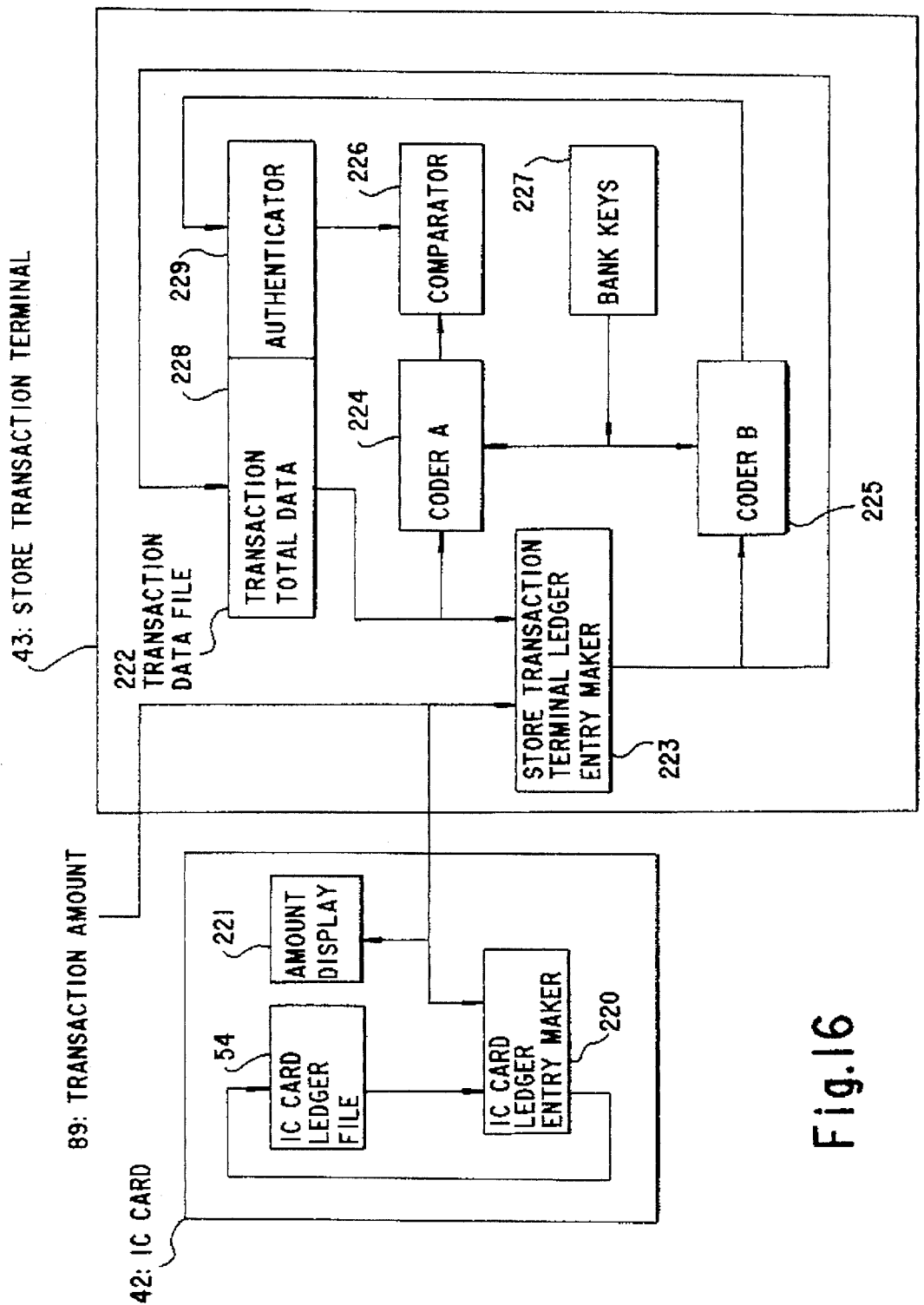
FIG. 16 is a block diagram of a third embodiment of this invention.

FIG. 16 is a block diagram of a third embodiment.

More specifically, FIG. 16 shows the system configuration between the IC card 42 and the store transaction terminal 43.

The IC card 42 comprises the IC card ledger file 54 a ledger entry maker 220, and an amount display 221.

The store transaction terminal 43 comprises a transaction data file 222, a store transaction terminal ledger entry maker 223, a coder A 224, a coder B 225, a comparator 226 and bank keys 227. The transaction data file 222 comprise transaction total data 228 and an authenticator 229.

When a holder of the IC card 42 makes a transaction with a participating store by using the IC card 42, the store transaction terminal 43 updates its transaction data file 222 and the IC card 42 updates the IC card ledger file 54 contemporaneously, thereby preventing a deceptive data conversion.

Before commencing a transaction by accepting the IC card 42, the store transaction terminal 43 has its coder A 224 code the transaction total data 228 (including both data on sales and sales returns and allowances) in the transaction data file 222 by using one of the bank keys 227 for an output to the comparator 226.

The store transaction terminal 43 comprises the bank keys 227 for respective banks whose networks the store participates in and selects one for a particular transaction.

The comparator 226 compares the transaction total data 228 having been coded by using one of the bank keys 228 with the authenticator 229, and determines whether or not the transaction total data 228 have been tampered at the time when the authenticator 229 is created.

That is, on detecting a match between the coded sales total data with the authenticator 229, the comparator 226 assumes that transaction total data 228 have been tampered and executes the transaction with the IC card 42. And on detecting a mismatch between the same, the comparator 226 assumes transaction total data 228 have been tampered and alerts an operator with an error message indicating a possible irregularity.

If the comparator 226 ascertains a normality, the store transaction terminal 43 proceeds on to the next processes by receiving the transaction amount 89, e.g. after the holder confirms the transaction amount 89 displayed on the monitor screen of the store transaction terminal 43.

Then, the store transaction terminal 43 has the store transaction terminal 223 add data on the transaction amount 89 to data on the transaction total data 228 in the transaction data file 222 by making a credit entry for a sale and a debit entry for a sales return, thereby updating the transaction total data 228.

The coder B 225 also receives the transaction total data 228 after a ledger updation, and codes them by the bank keys 227, and stores the result in the authenticator 229, thereby updating the authenticator 229.

The coding process for creating the authenticator 229 accords with a generic coding procedure, such as the FEAL algorithm, whereby only a few bits in original data are coded to create an authenticator. As such, it is possible to reconstruct the original data from the authenticator.

The IC card 42 also receives the transaction amount 89, has the amount display 221 manifest the transaction amount 89, and supplies it as an input to the IC card ledger entry maker 220, which makes a debit entry for a purchase (a sale for the participating store) and a credit entry for a purchases return (a sales return for the participating store).

As described above, the third embodiment of this invention is such that the store transaction terminal 43 codes the transaction total data 228, after being updated by the store transaction terminal ledger entry maker 223, for a comparison with the hitherto stored authenticator, thereby determining whether or not the store transaction terminal 43 has converted the transaction total data 228. This prevents the store transaction terminal 43 for being abused for falsifying data.

As well, it is possible to modify the third embodiment by substituting a full code for the authenticator 229, which does not affect the system configuration shown in FIG. 16 except for the substitution.

Before the store transaction terminal 43 updates the transaction total data 228 for the transaction amount 89 (by having the store transaction terminal ledger entry maker 223 make a credit entry for a sale and a debit entry for a sales return), the store transaction terminal 43 has the coder A 224 code the transaction total data 228 by using a selected one of the bank keys 227 for having the comparator 226 compare the newly coded sales total data with a code stored in advance corresponding to the sales total data 228.

If the comparator 226 detects a match, the store transaction terminal 43 executes an updation with the assumption that the transaction total data 228 have not been tampered. If the comparator 226 detects a mismatch, the store transaction terminal 43 does not execute an updation with the assumption that the transaction total data 228 have been tampered without an authorization, and alerts the operator with an error message indicating a possible irregularity.

Although the store transaction terminal 43 has the comparator 226 compare the newly coded sales total data with the code stored in advance corresponding to the transaction total data 228 and determine a match or a mismatch for detecting a data falsification in the third embodiment, since the transaction total data 228 can be reconstructed by decoding their coded data by using the selected one of the bank keys 227, the store transaction terminal 43 may alternatively have the comparator 226 compare the sales total data 28 with data decoded from the code stored in advance corresponding to the transaction total data 228 and determine a match or a mismatch for detecting a data falsification.

A generic coding procedure, such as the FEAL algorithm, may be used for coding the transaction total data 228 as for creating the authenticator 229.

When the comparator 226 determines a match, and detects no data alteration, the store transaction terminal 43 has the store transaction terminal ledger entry maker 223 post a corresponding ledger entry to the transaction total data 228 for the transaction amount 89 being displayed on the monitor screen of the store transaction terminal 43, thereby updating the transaction total data 228. As well, after the updation by the store transaction terminal ledger entry maker 223, the store transaction terminal 43 has the coder B 225 code the transaction total data 228 by using the selected one of the bank keys 227, and has the transaction data file 222 replace the authenticator with the code of the transaction total data 228.

The IC card 42 operates similarly with the third embodiment of this invention. That is, the IC card 42 also receives the transaction amount 89 as with the store transaction terminal 43. The IC card 42 has its amount display 221 display the amount and has the IC card ledger entry maker 220 post a corresponding ledger entry to the IC card ledger file 54 for the transaction amount 89 being displayed on the amount monitor 221, thereby updating the IC card ledger file 54.

Figure 17:
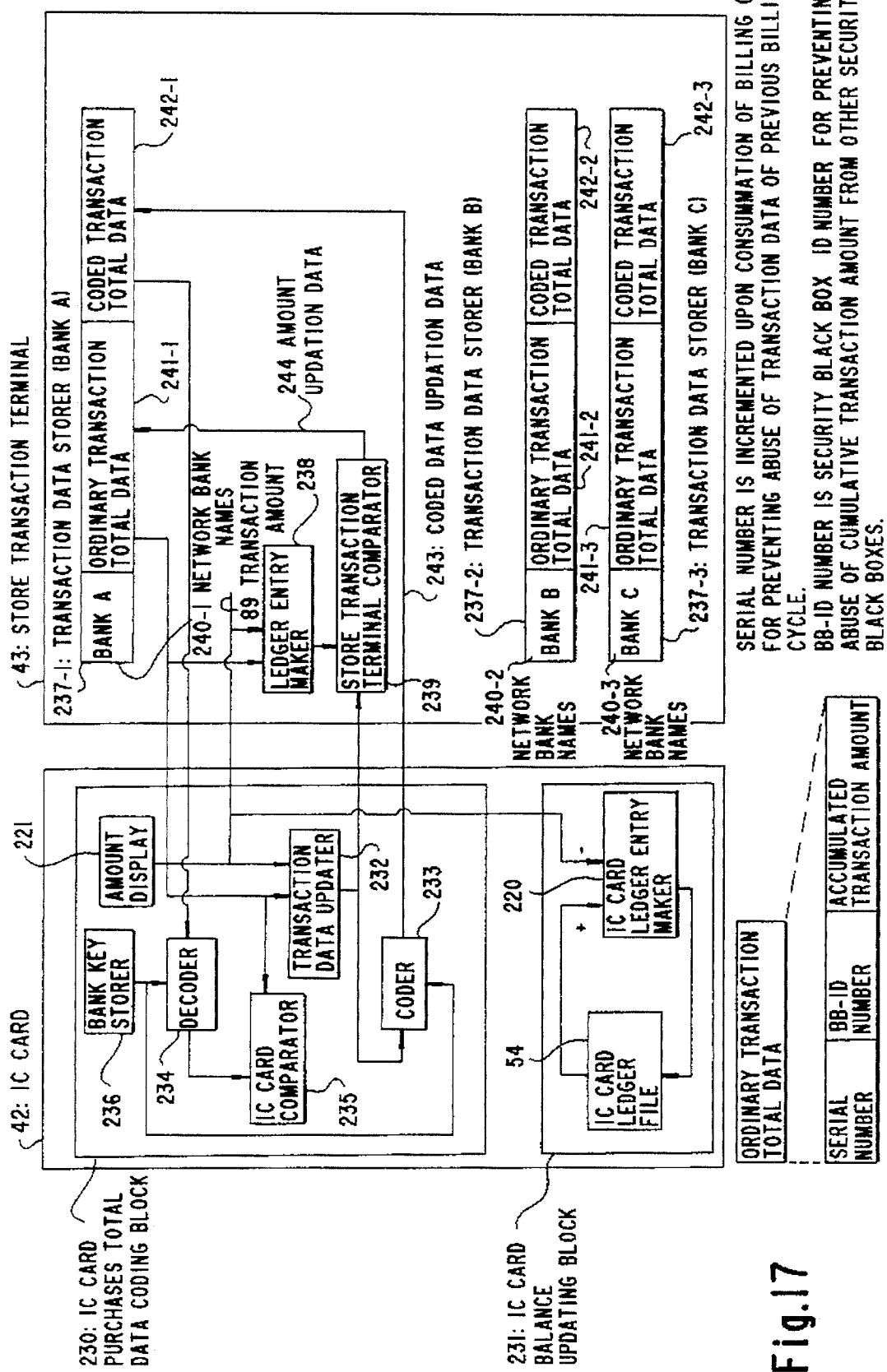
FIG. 17 is a block diagram of a fourth embodiment of this invention.

FIG. 17 is a block diagram of a fourth embodiment of this invention.

More specifically, FIG. 17 shows a system configuration in which the IC card 42 codes and updates purchases total data.

The IC card 42 comprises an IC card purchases total data coding block 230 and an IC card balance updating block 231.

The IC card purchases total data coding block 230 updates and codes sales total data (including both data on the sales and data on the sales returns and allowances) of the store transaction terminal 43 at which the holder of the IC card 42 uses his card for a transaction.

The IC card balance updating block 231 updates the balance stored in the IC card 42.

The IC card purchases total data coding block 230 comprises a transaction data updater 232, a coder 233, a decoder 234, an IC card comparator 235, a bank key storer 236 in addition to the amount display 221. The bank key storer 236 stores a bank key of the issuer (bank A) of the IC card 42 for use by the coder 233 in coding ordinary data and for use by the decoder 234 in decoding coded data.

The IC card balance updating block 231 comprises an IC card ledger file 54 and a ledger entry maker 220, and operates similarly with the IC card 42 in the first embodiment.

The store transaction terminal 43 comprises a sales data storer 237, an adder. 238 and a store transaction terminal comparator 239. The sales data storer 237 stores his own bank names 240, transaction total data 241 and coded transaction total data 242. The transaction data storer 237 (organized by the network bank names 240) comprises its subdivisions 237-1, 237-2, 237-3, . . . respectively for storing the corresponding subdivisions 240-1, 240-2, 240-3 . . . of the network bank names 240, the corresponding subdivisions 241-1, 241-2, 241-3, . . . of the ordinary transaction total data 241, and the corresponding subdivisions 242-1, 242-2, 242-3, . . . of the coded transaction total data 242.

When transaction data file 237 are updated for an execution of a transaction, the holder of the IC card 42 inserts his card into the store transaction terminal 43 for an input of the transaction amount 89 e.g. by confirming it displayed on the monitor screen of the store transaction terminal 43. An insertion of the IC card 42 causes subdivisions related to the issuer (e.g. bank A) of the IC card 42 of the ordinary transaction total data 241 (e.g. 241-1) and the coded transaction total data 242 (e.g. 242-2) in the transaction data storer 237 (e.g. 237-1) to be transmitted to the IC card 42. The IC card 42 has its decoder 234 receive and decode coded transaction total data 242-1 by using the selected one for bank A, of the bank keys stored in the bank key storer 236, thereby reconstructing ordinary transaction total data, that must match ordinary transaction total data 241-1, for a transmission to one input terminal of the IC card comparator 235. The IC card 42 has the IC card comparator 235 receive ordinary transaction total data 241-1 at the other input terminal for a comparison with the ordinary transaction total data reconstructed by the decoder 234 received at the other input terminal. If the comparison indicates no discrepancy, the IC card 42 determines that the store transaction terminal 43 has not falsified data. If, on the other hand, the comparison indicates a discrepancy, the IC card 42 determines that the store transaction terminal 43 has altered either ordinary transaction total data 241-1 or coded transaction total data 242-1, and terminates its processes by alerting an operator with an error message indicating a possible irregularity.

When the IC card comparator 235 detects no discrepancy, thereby determining no data conversion, the IC card 42 has its transaction data updater 232 receive the transaction amount 89 and the value of the ordinary transaction total data 241-1 stored in the transaction data storer 237-1 received from the store transaction terminal 43. The transaction data updater 232 updates the transaction total data by posting the transaction amount 89. The IC card 42 sends the updated result to the store transaction terminal 43 and the coder 233 in the IC card 42. The coder 233 codes the transaction total data by using one of the bank keys stored in the bank key storer 236 and sends the result as coded data updation data 243 to the store transaction terminal 43.

The store transaction terminal 43 receives an output (transaction total data) from the transaction data updater 232 as an input to its store transaction terminal comparator 239. The store transaction terminal 43 also comprises a transaction data updater 238 for independently updating the ordinary transaction total data 241 stored in the transaction total data storer 237 by adding the transaction amount 89 for calculating the transaction total data for another input to the store transaction terminal comparator 239.

Unless the store transaction terminal comparator 239 detects a discrepancy between transaction total data transmitted from the IC card 42 and transaction total data independently calculated by the store transaction terminal 43, the integrity of transaction total data are verified. The store transaction terminal 43 has its transaction data storer 237-1 store ordinary transaction data 241-1 as transaction data updation data 244. The store transaction terminal 43 has transaction data storer 237-1 store the coded data updation data 243 in coded transaction total data 242-1.

If, on the other hand, the IC card comparator 239 detects a discrepancy between transaction total data transmitted from the IC card 42 and transaction total data independently calculated by the store transaction terminal 43, the integrity of transaction total data are not verified, due to an error in at least one of the IC card 42 and the store transaction terminal 43, the store transaction terminal 43 terminates its processes and alerts an operator with an error message indicating a possible irregularity.

The IC card 42 updates its own stored balance in addition to the transaction data of the store transaction terminal 43. The IC card balance updating block 231 has the ledger entry maker 220 receive the balance data stored in the IC card ledger file 54, as well as the transaction amount 89 and make a ledger entry in correspondence with the transaction type. Then, the IC card 42 has the IC card ledger file 54 store the updated result, thereby consummating balance data updation.

The fourth embodiment is such that the IC card 42 calculates and codes the transaction total data 237 for the store transaction terminal 43, which is consequently not allowed to alter data.

Although the third embodiment leaves a room for data falsification by coding the transaction total such as when the store transaction terminal 43 deduces a bank key and uses the bank key for calculating and coding transaction total data 237, the fourth embodiment can prevent a data falsification due to a deduction of a bank key.

Also, a use of a bank-specific bank key allows only the IC card 42 issued by the bank corresponding to the bank key to be coded, which enhances the system security with a collateral advantage that the bank keys can be updated individually.

Also, the fourth embodiment of this invention is such that the store transaction terminal 43 has the transaction data storer 237 store both the ordinary transaction total data 241 and the coded transaction total data 242, as described earlier. However, it is also possible to code only a part of the ordinary transaction total data 244, thereby creating authenticators, and to have the transaction data storer 237 store the authenticators in lieu of the coded transaction total data 242.

Figure 18:
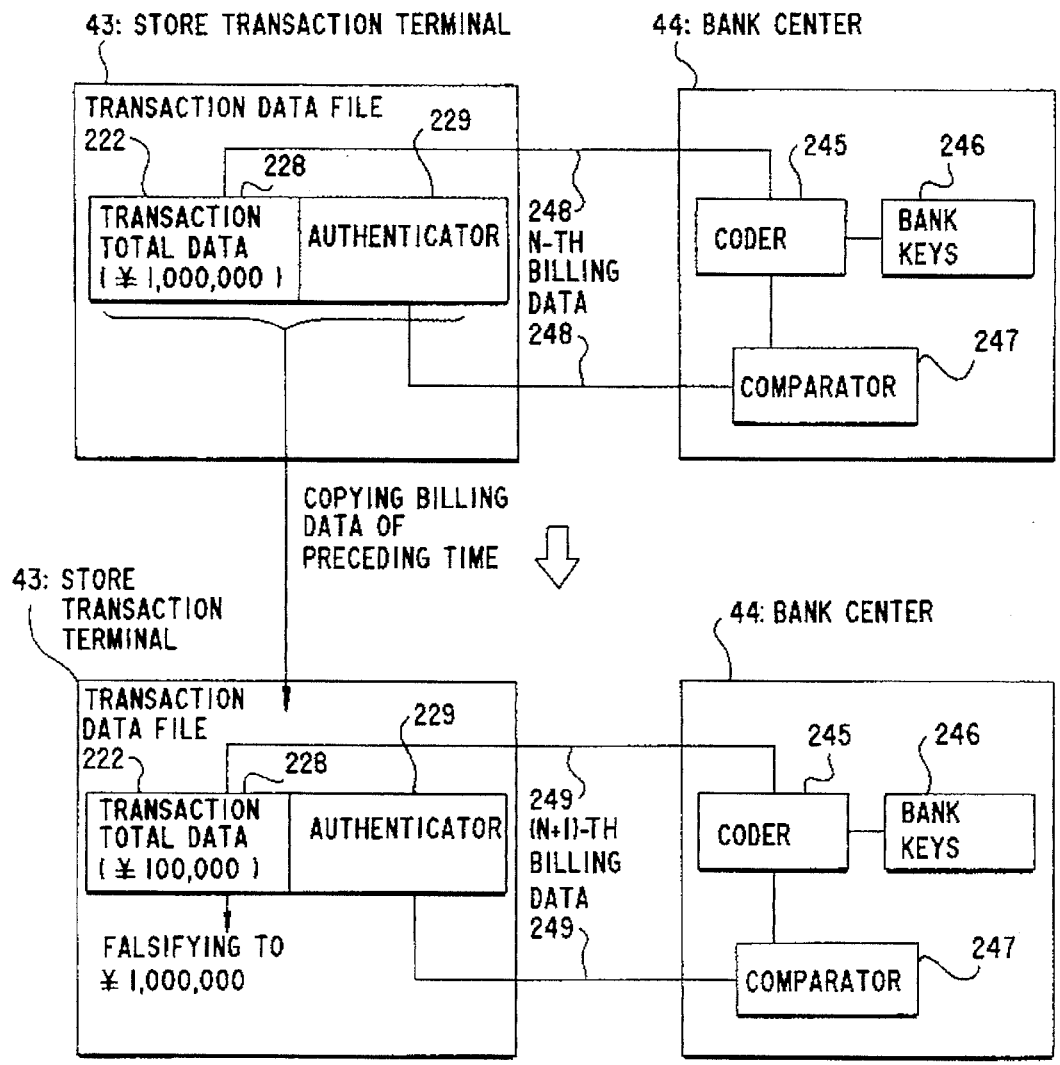
FIG. 18 is an explanatory chart illustrating a data falsification incidental to transaction data stored in the store transaction terminal 43 pursuant to the third and fourth embodiments of this invention.

FIG. 18 is an explanatory chart illustrating a data falsification incidental to transaction data stored in the store transaction terminal 43 pursuant to the third and fourth embodiments of this invention.

The store transaction terminal 43 has the transaction data file 222 store transaction total data 228 for a billing cycle and an authenticator 229 obtained by coding the sales total data 228. Assume now that the transaction total data 228 for a month indicates a net sales total of one million yen [¥1,000,000] and that the month represents an n-th billing cycle (thereby carrying a serial number n). N-th billing data 248 for the n-th billing cycle carries the authenticator 229 corresponding to the transaction total data 228 for a sales total of one million yen [¥1,000,000].

On receipt of the n-th billing data, the bank center 44 has the coder 245 code the n-th billing data by using the bank key 246, thereby creating an authenticator. The bank center 44 has the comparator 247 receive the authenticator 229 by coding for a comparison with the authenticator 229 transmitted from the store transaction terminal 43. If the comparator 247 detects no discrepancy, the bank center system 44 determines that data integrity is maintained, thus authorizing a settlement as requested in the billing data 228 for the n-th billing cycle to a store account by crediting the store account file 87 and debiting the unsettled funds file 86.

Assume further that the store transaction terminal 43 makes a net sales total of only one hundred thousand yen [¥100,000] during the succeeding month, which is an (n+1)-th billing cycle and that an attempt is made to alter the transaction data of the next month by copying the transaction data file 222 of the preceding month, which is the preceding billing cycle, as the transaction data file 222 of the month. That is, the transaction total data 228 for the net total sales of one million yen [¥1,000,000] and the corresponding authenticator 229 of the n-th billing cycle are copied as the (n+1)-th billing cycle.

In such a case, the store transaction terminal 43 sends to the bank center 44 "as is" the contents of transaction data file 222 of the n-th billing cycle copied as (n+1)-th billing data 249 for the (n+1)-th billing cycle, which carries the authenticator 229 corresponding to the transaction total data 228 for a sales total of one million yen [¥1,000,000], instead of one hundred thousand yen [¥100,000]. That is, the bank center 44 receives the transaction total data 228 of the n-th billing cycle for the net total sales of one million yen [¥1,000,000]. The bank center 44 has the coder 245 code the transaction total data 228 by using the bank key 246 for a comparison with the authenticator 229. However, because the bank center 44 cannot detect a copying of data during the n-th billing cycle, it cannot prevent such a fraud. The store transaction terminal 43 can falsify data at any time, e.g. at the end of a billing cycle or during a billing cycle.

This is because the transaction total data 228 has a one-to-one correspondence with the authenticator 229. Accordingly, it is effective in preventing a data falsification to assign a serial number to the transaction data file 222 identifying the billing period.

Figure 19:
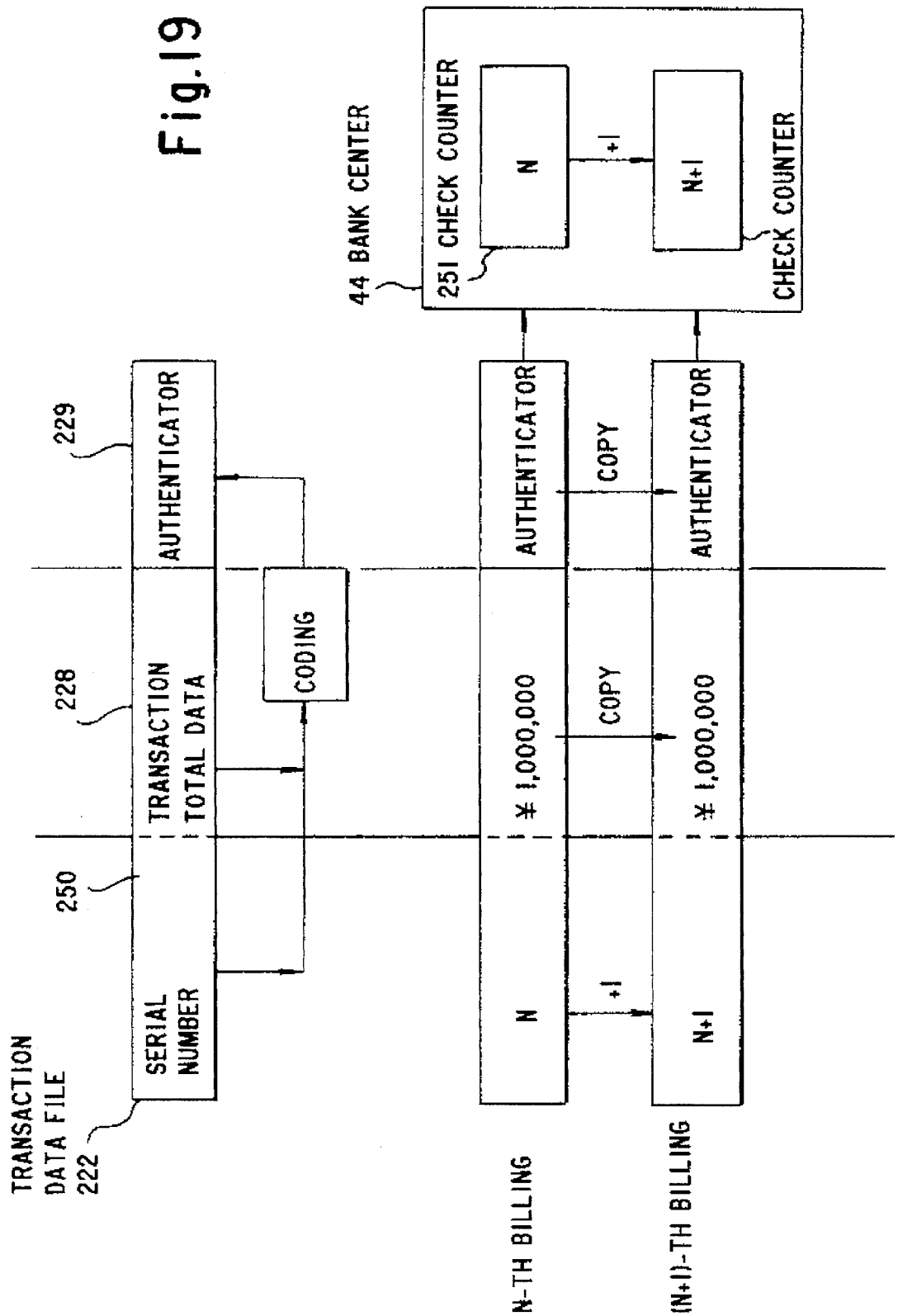
FIG. 19 is an explanatory chart for a system configuration of a fifth embodiment of this invention in which a serial number is assigned to a transaction data file 222.

FIG. 19 is an explanatory chart for a system configuration of a fifth embodiment of this invention in which a serial number is assigned to a transaction data file 222.

The store transaction terminal 43 comprises a counter for incrementing at each billing to the bank center 44 a serial number attached to the transaction data file 222. The bank center 44 has a check counter 251 store a serial number in correspondence with the store transaction terminal 43. The store transaction terminal 43 sends as billing data the transaction total data 228 and the authenticator 229 in the transaction data file 222. The IC card 42 obtains The authenticator 229 is coded billing data, which is coded by the IC card 42 and which is a combination of the transaction total data 228 and the serial number 50 attached.

In an example shown in FIG. 18, the n-th billing data 248 has the transaction total data 228 of one million yen [¥1,000,000]. Hence, the IC card 42 creates the authenticator 229 by coding a combination of a serial number n with the transaction total data 228 of one million yen [¥1,000,000]. The bank center 44 has its check counter 251 detect a settlement request as the n-th billing. By coding a combination of the serial number n obtained from the check counter 251 with the current value of one million yen [¥1,000,000] in the transaction total data 228, the bank center 44 obtains an authenticator for a comparison with the authenticator 229 received from the store transaction terminal 43. On detecting no discrepancy, the bank center 44 transfers money between the unsettled funds file 86 and the store account file 87 as requested by the store transaction terminal 43. On detecting a discrepancy, the bank center 44 alerts an operator with an error message indicating a possible irregularity.

Also, in the example shown in FIG. 18, the net sales total during the (n+1)-th billing cycle is one hundred thousand yen [¥100,000]. Although an attempt is made to falsify the (n+1)-th billing data 249 by copying the n-th billing data 248, because the bank center 44 detects the settlement request as the one for (n+1)-th billing cycle from an output of the check counter 251 and obtains an authenticator by coding a combination of serial number n+1 and one million yen [¥1,000,000] in the transaction total data for a comparison with the authenticator 229 (which the store transaction terminal 43 obtains by coding a combination of serial number n and the transaction total data 228) transmitted from the store transaction terminal 229 in the (n+1)-th billing data 249, the bank center 44 detects a discrepancy and does not execute a money transfer.

Although the fifth embodiment is such that the store transaction terminal 43 and the bank center 44 both code a combination of the transaction total data 228 for a billing cycle and a serial number indicating the number of settlement requests for a comparison, a modified form of the fifth embodiment is possible with a date and time of the inception of the billing cycle substituted for a serial number.

The store transaction terminal 43 creates an authenticator by coding a combination of the transaction total data 228 and the date and time of the inception of the billing cycle. The bank center 44 controls the date and time of the inception of a preceding billing cycle attached to the transaction total data 228 from the store transaction terminal 43 for a comparison with the date and time of the inception of a current billing cycle. The bank center 44 detects a fraud if the date and time of the preceding billing cycle is not earlier than the date and time of the current billing cycle. If the date and time of the preceding billing cycle is earlier than the date and time of the current billing cycle, the bank center 44 codes a combination of the date and time of the inception of the current billing cycle, thereby creating an authenticator for a comparison with the authenticator 229. On detecting no discrepancy, the bank center 44 transfers money as requested by the store transaction terminal 43. On detecting a discrepancy, the bank center 44 does not transfer money and instructs an operator with an error message indicating a possible irregularity.

Figure 20:
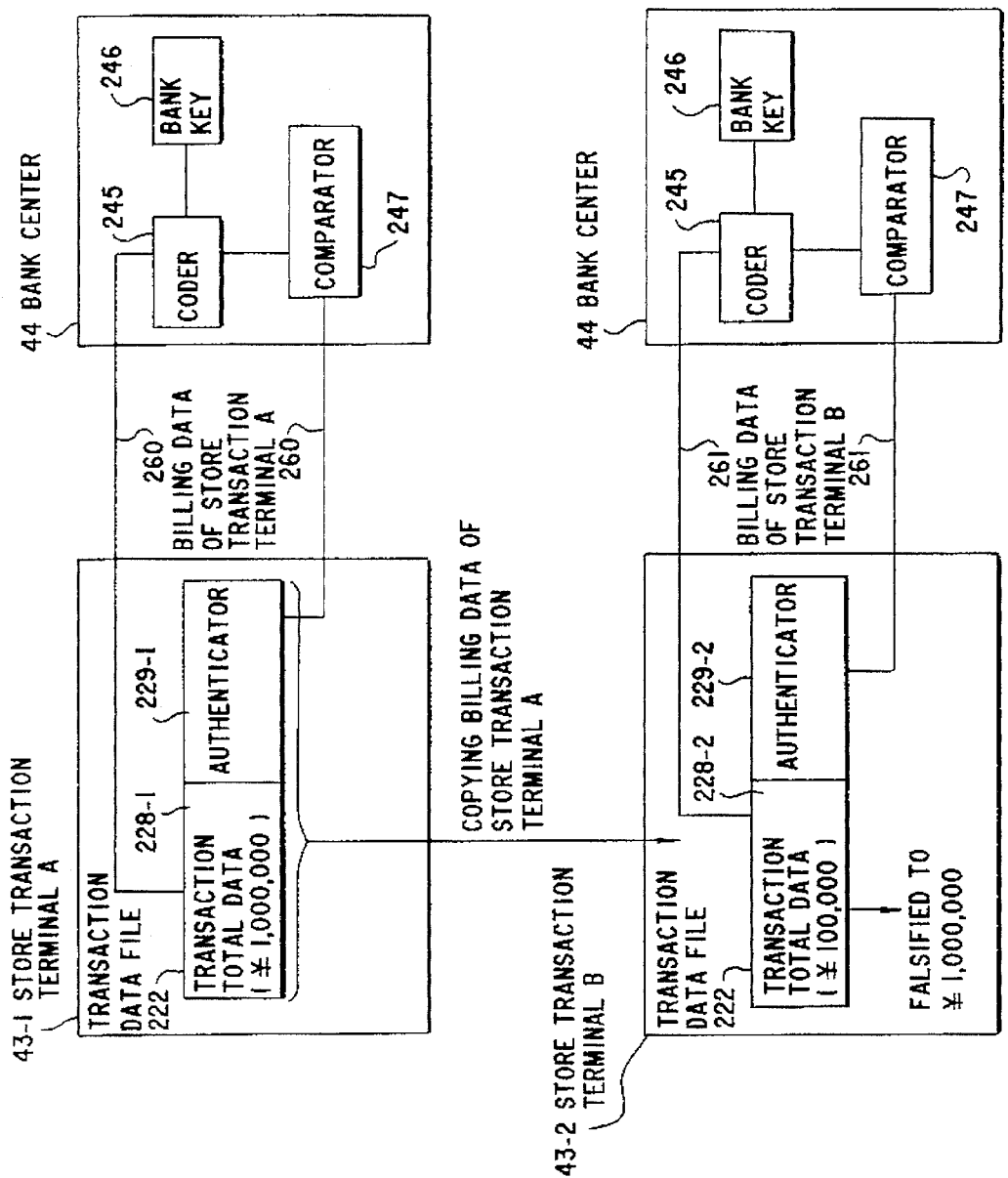
FIG. 20 is an explanatory chart illustrating a data falsification incidental to transaction data stored in the store transaction terminal 43 pursuant to the fifth embodiment of this invention.

FIG. 20 is an explanatory chart illustrating a data falsification incidental to transaction data stored in the store transaction terminal 43 pursuant to the fifth embodiment of this invention.

Assume a store has two [2] store transaction terminals A 43-1 and B 43-2. Assume further that store transaction terminal A 43-1 has transaction total data 228-1 of one million yen [¥1,000,000] and that store transaction terminal B 43-2 has transaction total data 228-1 of one hundred thousand yen [¥100,000]. Their respective authenticators 29-1 and 29-2 are obtained by coding respective transaction total data 228-1 and 228-2.

If an attempt is made to falsify transaction data file 222-2 for store transaction terminal B 43-2 by copying transaction data file 222-1 for store transaction terminal A 43-2, both transaction total data 228-2 and transaction total data 228-1 represent net total sales of one million yen [¥1,000,000]. On receiving the billing data 261, the bank center 44 codes transaction total data 228-2 by using the bank key 246 and has the comparator 247 compare the coded transaction total data 228-2 with the authenticator 229-2. Because the bank center 44 cannot detect a difference between store transaction terminal A 43-1 and store transaction terminal B 43-2, the comparator 247 cannot detect a discrepancy, thereby causing a settlement to be made as requested by the participating store.

Figure 21:
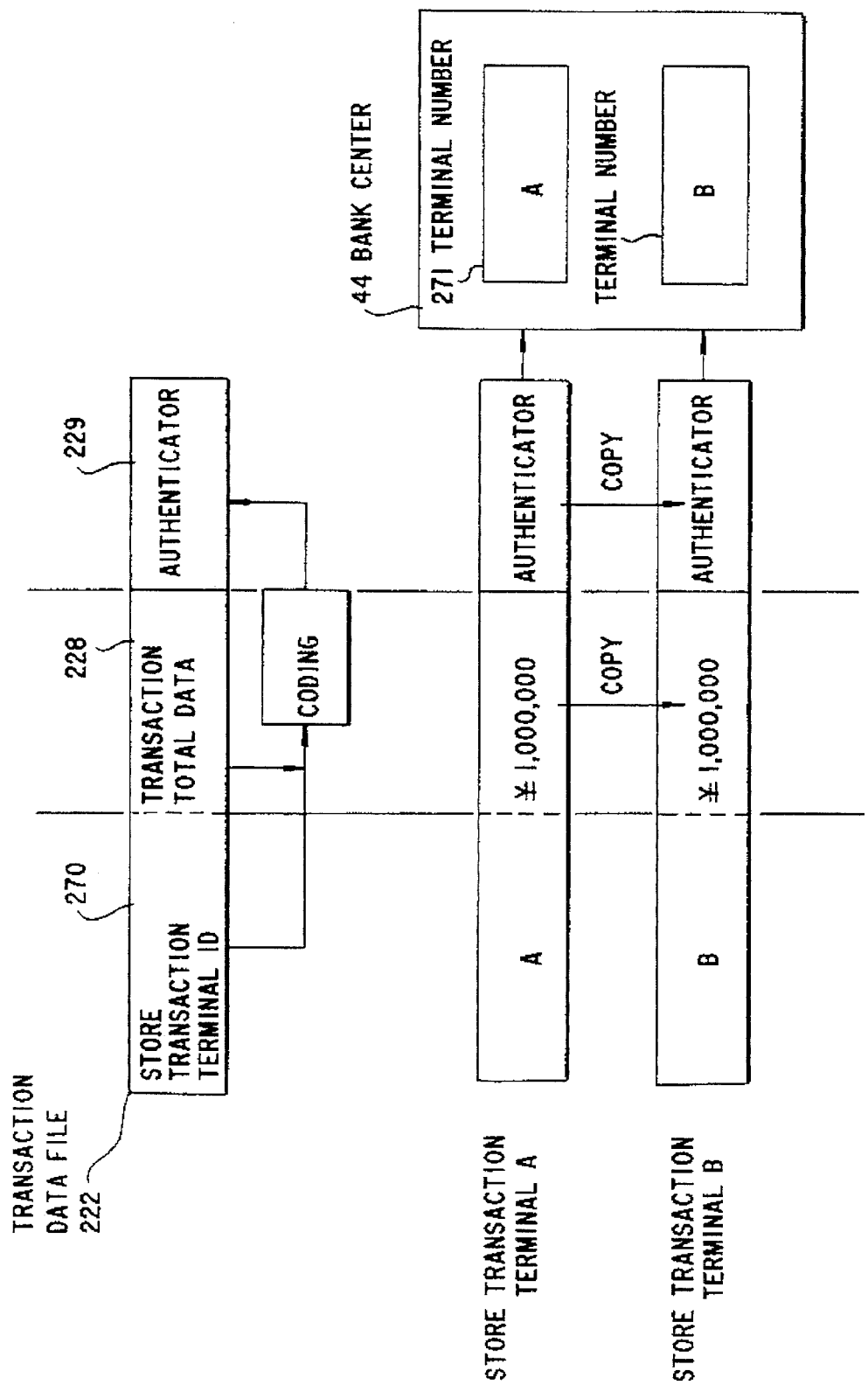
FIG. 21 is an explanatory chart for a system configuration of a sixth embodiment of this invention in which a store transaction terminal identification number is assigned to a transaction data file 222.

FIG. 21 is an explanatory chart for a system configuration of a sixth embodiment of this invention in which a store transaction terminal identification number is assigned to a transaction data file 222.

The sixth embodiment of this invention is conceived for preventing a fraud enabled by copying data of other sales transaction terminals.

The bank center 44 assigns a store transaction terminal ID 270 uniquely to the store transaction terminal 43, which requests a settlement to the bank center 44 by including the store transaction terminal ID 270 in the transaction data file 222. The bank center 44 also controls a store transaction terminal number 271 of the store transaction terminal 43.

The store transaction terminal 43 has the IC card 43 calculate the authenticator 229 for a combination of the transaction total data 228 and the store transaction terminal ID 270 and stores the authenticator 229. When the store transaction terminal 43 requests the bank center 44 for a settlement, the store transaction terminal 43 sends the transaction total data 228 and the authenticator 229. The bank center 44 determines whether or not more than one [1] billing request of the same store transaction terminal ID 270 has been made, and detects a fraudulent billing request by the store transaction terminal ID 270. Unless there are plural billing request having the same store transaction terminal ID 270, the bank center has its coder code the transaction total data 228, thereby obtaining an authenticator for a comparison with the authenticator 229 received from the store transaction terminal 43. On detecting no discrepancy, the bank center 44 makes a settlement as requested. On detecting a discrepancy, the bank center 44 does not make a settlement and alerts an operator with an error message indicating a possible irregularity.

As described above in detail, the key control for an electronic cashless transaction medium of this invention enables bank keys to be individually customized, which is effective in enhancing the system security against a possible forgery in an electronic cashless transaction system.

Also, since the ATM 44A does not have a coding key, a theft of the ATM 44A poses no threat to the system security, thereby allowing an installment of the ATM 44A in a location without a strong physical protection. This in turn enables a wider use of an electronic cashless transaction medium embodied by the IC card 42. Because a probability of an illicit money transfer realized by eavesdropping is very low, this invention enables such an electronic cashless transaction medium to be issued with an enhanced system security.

This invention also enhances system security by making it difficult to manipulate the ATM 44A and the store transaction terminal 43. This in turn allows a powerful general-purpose card having a cash value to be issued instead of a limited-purpose card having no cash value because of lack of security.

It goes without saying that the IC card 42 can also be used as a substitute for or a complement to an ordinary passbook by adding necessary functions.

Because the security enhancement enabled by a key control system of this invention safeguards data exchanges between the bank center 44 and the IC card 42, it becomes possible to add extra functions to the IC card 42, such as allowing a balance stored in the IC card 42 to earn an interest at a variable rate just like a super checking account, e.g. when the combined total balance of an account holder does not fall below a predetermined threshold.

In addition, the IC card 42 can be used not only as an electronic cashless transaction medium for intercorporate or consumer transactions but also as a token for intracorporate transactions capable of creating accounting records, thereby playing a role in a strategic management information system.

What is claimed is:

1. An electronic cashless transaction system in which:

a bank center stores in an IC card a sum of amount transfer data from a holder's account as an unsettled funds file, and a store transaction terminal at a participating store stores a transaction amount totalled by each network bank for executing a settlement by billing to the bank center amount data on every lapse of a duration, and the IC card has its balance register store a usable amount after an input of the bank center for a storage of a usable amount in the balance register after a balance adjustment after each transaction;

said electronic cashless transaction system comprising:

an accumulated transaction data register/coder means provided in the IC card for calculating accumulated transaction data in the store transaction terminal for a predetermined period, and for boding said accumulated transaction data in the store transaction terminal by using Bank key;

an accumulated transaction data storer means for storing said accumulated transaction data and their code obtained by said transaction data register/coder means;

a fraud-proof detector means for, each time a store transaction is made using IC card, coding the accumulated transaction data stored in said accumulated transaction data store means before operating in said accumulated transaction data register/coder means, checking through comparison whether or not the coded accumulated transaction data match the coded data previously stored in said accumulated transaction data store means, and determining that no fraud-proof has been made if a check indicates a coincident result and that a fraud-proof has been made to the accumulated transaction data if the check indicates a non-coincident result;

a fraud-proof settlement maker means, activated by a billing request, for detecting from accumulated transaction data and their code whether or not transaction data billed from said store transaction terminal to said bank center have been altered during a predetermined duration, for transferring money to a store account on detecting no discrepancy, thereby making a settlement as requested by said store transaction terminal, and for terminating the process without making a settlement on detecting a discrepancy.

2. The electronic cashless transaction system according to claim 1, wherein:

said transaction total register/coder means uses an authenticator for coding transaction data.

3. The electronic cashless transaction system according to claim 1, wherein:

said fraud-proof detector means is provided in at least one of said store transaction terminal and said IC card.

4. The electronic cashless transaction system according to claim 1, wherein:

said accumulated transaction data register/coder means, provided in said IC card, changes bank keys used for coding on every bank, thereby preventing coding from being performed by an IC card issued by a foreign bank.

5. The electronic cashless transaction system according to claim 1, wherein:

said accumulated transaction data register/coder means codes an identification number proprietary to said store transaction terminal and at least one [1] of a serial number incremented by each billing to said bank center and a date and time of starting to accumulating transaction data, in addition to said accumulated transaction data.

6. The electronic cashless transaction system according to claim 1, further comprising a fraud detector means for coding accumulated transaction data stored in said accumulated transaction data storer means, before an execution of said transaction total register/coder means, upon starting each transaction, for a comparison with a code stored in said accumulated transaction data storer means for determining a match or a mismatch, thereby determining a presence or absence of a data alteration.

* * * * *

UNITED STATES PATENT AND TRADEMARK OFFICE
CERTIFICATE OF CORRECTION

PATENT NO. : 5,539,825
DATED : July 23, 1996
INVENTOR(S) : Akiyama, et. al.

It is certified that error appears in the above-indentified patent and that said Letters Patent is hereby corrected as shown below:

Title page, item [75], inventor:
    line 2, please delete "both of Kawasaki"

insert therefor first inventor's city -- Tokyo -- and second inventor's city -- Hyogo --.

Signed and Sealed this

Twenty-sixth Day of November 1996

Attest:

BRUCE LEHMAN

*Attesting Officer*    *Commissioner of Patents and Trademarks*